United States Patent
Akada

(10) Patent No.: US 7,149,419 B2
(45) Date of Patent: Dec. 12, 2006

(54) POSITION CONTROL DEVICE, IMAGE BLUR CORRECTION DEVICE, AND OPTICAL APPARATUS

(75) Inventor: Hiroshi Akada, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 193 days.

(21) Appl. No.: 11/032,647

(22) Filed: Jan. 10, 2005

(65) Prior Publication Data

US 2005/0169618 A1    Aug. 4, 2005

(30) Foreign Application Priority Data

Jan. 30, 2004    (JP)    ............... 2004-024924

(51) Int. Cl.
*G03B 17/00*   (2006.01)
*E05B 51/00*   (2006.01)

(52) U.S. Cl. .......................... 396/55; 70/275
(58) Field of Classification Search .......... 396/55; 70/275
See application file for complete search history.

(56) References Cited

U.S. PATENT DOCUMENTS 5,398,132 A * 3/1995 Otani ................... 359/557
5,656,899 A * 8/1997 Kuroda ................. 318/283
5,974,269 A   10/1999 Sato et al. ............. 396/55
2002/0154223 A1* 10/2002 Moriya ............... 348/208.11

FOREIGN PATENT DOCUMENTS

| JP | 10-142647  | 5/1998  |
|----|------------|---------|
| JP | 10-293334  | 11/1998 |
| JP | 10-293335  | 11/1998 |

* cited by examiner

*Primary Examiner*—W. B. Perkey
(74) *Attorney, Agent, or Firm*—Cowan, Liebowitz & Latman, P.C.

(57) ABSTRACT

A position control device having first and second movable members. A first detector outputs a position signal when the first movable member is looked in a first predetermined position in a first region. A second detector outputs a first signal when the second movable member is located in either the first region or a second region where it is released, and a second signal when the second movable member is located in a third region. A controller determines the region in which the second movable member is located based on the detector outputs and when the determined region is the first region, an actuator moves the second movable member to a second predetermined position in the first region, and when the determined region is the second or third region, the actuator moves the second movable member to the second predetermined position.

16 Claims, 16 Drawing Sheets

POSITION CONTROL DEVICE, IMAGE BLUR CORRECTION DEVICE, AND OPTICAL APPARATUS

BACKGROUND OF THE INVENTION

1. Field of the Invention

The present invention relates to an optical apparatus (such as a lens system or, a camera system) having an image blur correction function installed therein.

2. Related Background Art

For example, as described in Japanese Patent Application Laid-Open No. H10-293335, a conventional lens barrel is constructed such that the lens barrel includes a position control device having a movable member which is adapted to move between a first position for providing a first function state and a second position for providing a second function state, and a stepping motor for driving the movable member between the first position and the second position, and rotor positions of the stepping motor in the first and second positions of the movable member are made electrically in phase with each other.

In addition, the conventional lens barrel is constructed such that the lens barrel includes movable member which is adapted to move between a first position for providing a first function state and a second position for providing a second function state, and a stepping motor for driving the movable member between the first position and the second position, and an abutment portion is provided in a position beyond a range between the first and second positions, and an interval between the abutment position and the first or second position is set smaller than a traveling amount of the movable member corresponding to a half period of an energization phase of the stepping motor.

According to the related art as described above, in a case where the movable member unexpectedly moves from a predetermined reference position when an interchangeable lens is taken off from a camera while the movable member is driven to interrupt halfway the supply of a driving voltage, or a shock or the like is applied to a lens main body, the movable member is caused to abut against the abutment portion to be returned back to the predetermined reference position (initial state).

However, with such a construction, since the movable member abuts against the abutment portion whenever the movable member is returned back to the reference position (initial state), an impulsive sound is generated whenever the movable member abuts against the abutment portion. In addition, when the traveling speed of the movable member is further increased, there is a possibility that the durability of a movement transfer mechanism of the movable member may be reduced since an impulsive force (destruction force) when the movable member abuts against the abutment portion increases.

Moreover, according to the above-mentioned related art, in order to relax the impulsive force, there is adopted a construction in which the abutment portion is formed of an elastic member. However, when the traveling speed of the movable member is increased to increase the impulsive force, or when the precision is enhanced by using a stepping motor having a smaller step angle, the interval between the abutment portion and the first or second position becomes larger than the traveling amount of the movable member corresponding to the half period of the energization phase of the stepping motor owing to the elastic deformation of the elastic member. As a result, the construction of the above-mentioned related art is not established.

SUMMARY OF THE INVENTION

The present invention has been made in view of the above-mentioned circumstances, and it is therefore an object of the present invention to provide a position control device capable of preventing generation of an impulsive sound due to collision of a movable number against an abutment portion to have a construction coping with the high-speed driving of the movable member, a correction optical device (image blur correction device), and an optical apparatus including the position control device and the correction optical device.

According to an aspect of the present invention, there is provided a position control device, including:

a first movable member;

a second movable member for moving among a first region in which the first movable member is locked in a first predetermined position, a second region in which the lock state of the first movable member is released, and a third region which is as a transfer region between the first region and the second region;

a first detector for outputting a position signal corresponding to whether or not the first movable member is located in the first predetermined position;

a second detector for outputting a first signal in a state where the second movable member is located in one of the first region and the second region, and for outputting a second signal in a state where the second movable member is located in the third region; and a controller for controlling an actuator for driving the second movable member, in which the controller discriminates the region in which the second movable member is located based on the position signal, the first signal and the second signal, when the discrimination result shows that the second movable member is located in the first region, controls the actuator in a first mode to move the second movable member to a second predetermined position set in the first region, and when the discrimination result shows that the second movable member is located in one of the second region and the third region, controls the actuator in a second mode to move the second movable member to the second predetermined position.

Further, according to another aspect of the present invention, there is provided a position control device, including:

a first movable member;

a second movable member for moving among a first region in which the first movable member is locked in a first predetermined position, a second region in which the lock state of the first movable member is released, and a third region which is as a transfer region between the first region and the second region;

a first detector for outputting a position signal corresponding to whether or not the first movable member is located in the first predetermined position;

a second detector for outputting a first signal in a state where the second movable member is located in one of the first region and the second region, and for outputting a second signal in a state where the second movable member is located in the third region; and a controller for controlling an actuator for driving the second movable member, in which the controller moves the second movable member to a second predetermined position set in the first region based on the position signal, and the first signal and the second signal.

Still further, according to another aspect of the present invention, there is provided a position control device, including:

a first movable member;

a second movable member for moving among a first region in which the first movable member is locked in a first predetermined position, a second region in which the lock state of the first movable member is released, and a third region which is as a transfer region between the first region and the second region;

a detector for outputting a first signal in a state where the second movable member is located in one of the first region and the second region, and for outputting a second signal in a state where the second movable member is located in the third region; and a controller for controlling an actuator for driving the second movable member, in which when the control for the actuator is interrupted, the controller determines a control content after restart of the control for the actuator based on output history of the first signal and the second signal from the detector until the interruption.

Yet further, according to another aspect of the present invention, there is provided an image blur correction device, including:

a lens hold member;

a lock movable member for moving among a first region in which the lens hold member is locked in a first predetermined position, a second region in which the lock state of the lens hold member is released, and a third region which is as a transfer region between the first region and the second region;

a first detector for outputting a position signal corresponding to whether or not the lens hold member is located in the first predetermined position;

a second detector for outputting a first signal in a state where the lock member is located in one of the first region and the second region, and for outputting a lock in a state where the lock member is located in the third region; and a controller for controlling an actuator for driving the lock member, in which the controller discriminates the region in which the lock member is located based on the position signal, the first signal and the second signal, when the discrimination result shows that the lock member is located in the first region, controls the actuator in a first mode to move the lock member to a second predetermined position set in the first region, and when the discrimination result shows that the lock member is located in one of the second region and the third region, controls the actuator in a second mode to move the lock member to the second predetermined position.

Furthermore, according to another aspect of the present invention, there is provided an image blur correction device, including:

a lens hold member;

a lock for moving among a first region in which the lens hold member is locked in a first predetermined position, a second region in which the lock state of the lens hold member is released, and a third region which is as a transfer region between the first region and the second region;

a first detector for outputting a position signal corresponding to whether or not the lens hold member is located in the first predetermined position;

a second detector for outputting a first signal in a state where the lock member is located in one of the first region and the second region, and for outputting a second signal in a state where the lock member is located in the third region; and a controller for controlling an actuator for driving the lock member, in which the controller, moves the lock member to a second predetermined position set in the first region based on the position signal, and the first signal and the second signal.

Moreover, according to another aspect of the present invention, there is provided an image blur correction device, including:

a lens hold member;

a lock member for moving among a first region in which the lens hold member is locked in a first predetermined position, a second region in which the lock state of the lens hold member is released, and a third region which is as a transfer region between the first region and the second region;

a detector for outputting a first signal in a state where the lock member is located in one of the first region and the second region, and for outputting a second signal in a state where the lock member is located in the third region; and a controller for controlling an actuator for driving the lock member, in which when the control for the actuator is interrupted, the controller determines a control content after restart of the control for the actuator based on output history of the first signal and the second signal from the detector until the interruption.

In addition, according to the present invention, there is provided an optical apparatus including the position control device.

Further, according to the present invention, there is provided an optical apparatus including the image blur correction device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will hereinafter be described in detail.

First of all, a description will now be given with respect to a construction of a lens system and a camera system (optical apparatus) in each of which an image blur correction unit of the present invention is installed.

Figure 15:
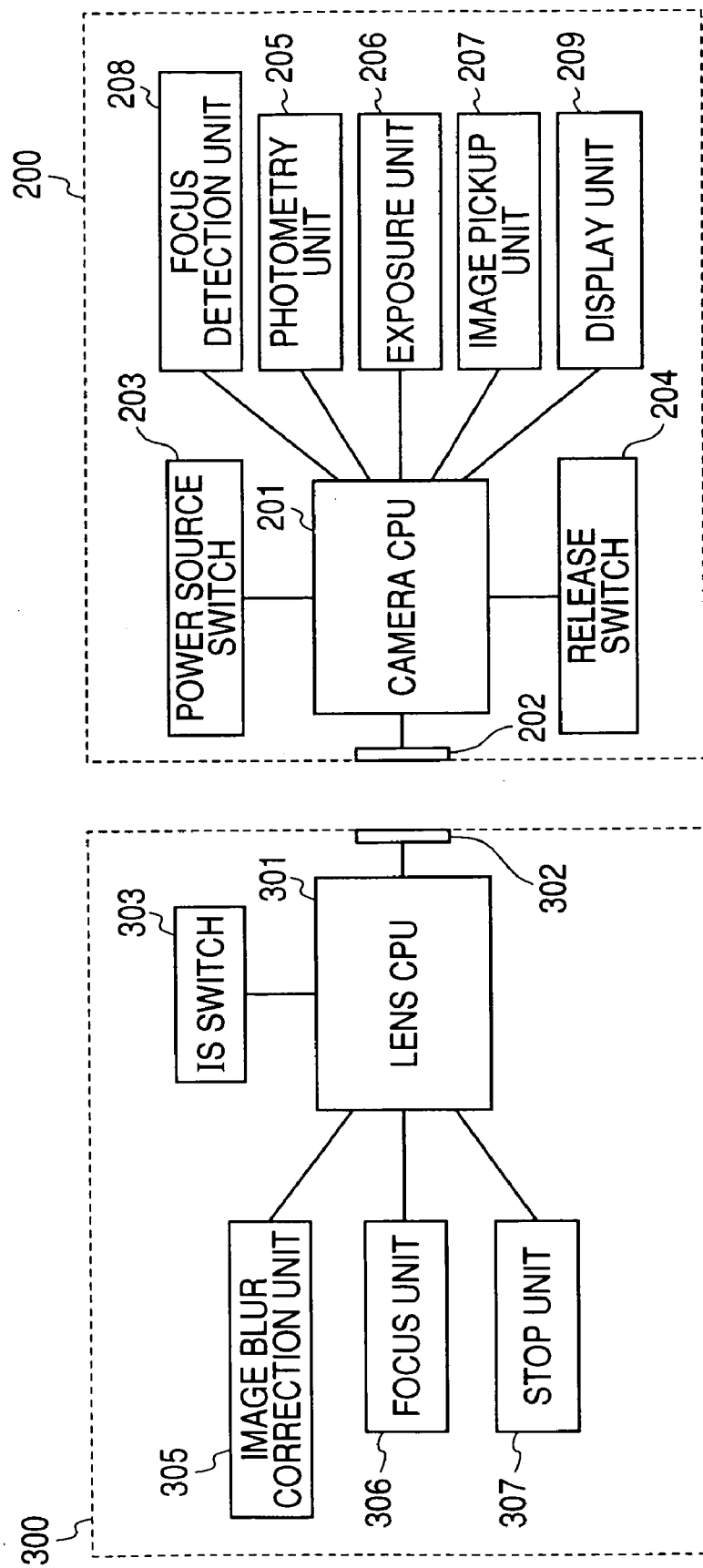
FIG. 15 is a block diagram of a lens exchange type AF single-lens reflex camera system.

FIG. 15 is a block diagram showing a configuration of the camera system (including the lens system) having the image blur correction unit installed therein.

Referring to FIG. 15, reference numeral 200 designates a camera main body, reference numeral 300 designates an interchangeable lens main body, and reference numeral 201 designates a camera CPU constituted by a microcomputer for controlling operations of the various circuits within the camera main body 200, which will be described later. When the lens main body 300 is installed to the camera main body 200, a lens contact 302 is connected to a camera contact 202, and in this state, the camera CPU 201 communicates with a lens CPU 301. Reference numeral 203 designates a power source switch which can be manipulated from the outside. Upon turn-ON of the power source switch 203, the camera CPU 201 is activated so that an electric power can be supplied to actuators, sensors, and the like within the camera system and also the camera system can operate. Reference numeral 204 designates a two-stage stroke type release switch which can be manipulated from the outside. A signal through the release switch 204 is input to the camera CPU 201.

When the release switch 204 is manipulated in the first stroke (a signal SW1 is generated), the camera CPU 201 instructs a photometry unit 205 to determine an amount of exposure, instructs a focus detection unit 208 to detect a focal point of a subject to output a drive signal to a focus unit 306 which will be described later based on the focal point detection results, and carries out the focus judgment and the like, and then enter a photographing preparation state. On the other hand, when the release switch 204 is manipulated in the second stroke (a signal SW2 is generated), the camera CPU 201 issues a drive instruction to drive a stop unit 307 within the lens main body 300 which will be described later to the lens CPU 301 within the lens main body 300 (for controlling operations of the various device circuits within the lens main body 300 which will be described later and for communicating with the camera CPU 201 through connection between the lens contact 302 and the camera contact 202 when the lens main body 300 is installed to the camera main body 200), and also outputs an operation signal used to start an exposure operation for an image pickup unit 207 (such as a CCD or a CMOS image sensor) to an exposure unit 206.

Reference numeral 209 designates a display unit for displaying thereon the various photographing conditions such as a stop value and a shutter speed, and data on the number of sheets of films for photographing, a remaining power of a battery, and the various modes in accordance with a command issued from the camera CPU 201.

Reference numeral 303 designates an image blur correction operation switching switch (hereinafter referred to as "an IS switch" for short) which can be manipulated from the outside. Whether or not an image blur correction operation (hereinafter referred to as "an IS operation" as well for short) which will be described later is carried out can be selected by manipulating the IS switch 303. Reference numeral 305 designates an image blur correction unit which is roughly classified into the following six constituent elements. A first constituent element is an image blur correction optical system including an image blur correction lens and a hold frame for holding the image blur correction lens. A second constituent element is a drive mechanism for driving the image blur correction optical system. A third constituent element is a position detection circuit for detecting a position of the moved image blur correction optical system. A fourth constituent element is a lock mechanism adapted to lock the image blur correction optical system to a predetermined position (optical axis central position) and to unlock the image blur correction optical system from the predetermined position. A fifth constituent element is a lock drive mechanism for driving the lock mechanism. Also, a sixth constituent element is a vibration detection circuit for detecting accelerations or velocities of a vertical vibration and a horizontal vibration of the camera to detect a vibration state as an object of vibration correction.

Reference numeral 306 designates a focus unit including: a focus lens and a hold frame for holding the focus lens; a focus lens drive mechanism for driving the focus lens to a target position; a transfer mechanism for transferring a drive force by the focus lens drive mechanism in the form of a movement force of the focus lens; and a focus lens drive circuit for being controlled by the lens CPU 301 in accordance with information on an amount of movement of the focus lens transmitted from the camera CPU 201 in a manner as described above to send a drive command to the focus lens drive mechanism.

Reference numeral 307 designates a stop unit including: a stop mechanism for setting an aperture area; a stop mechanism drive unit for driving the stop mechanism; and a stop drive circuit for being controlled by the lens CPU 301 in accordance with a stop operation instruction transmitted from the camera CPU 201 in a manner as described above to send a drive command to the stop mechanism drive unit.

Figure 16:
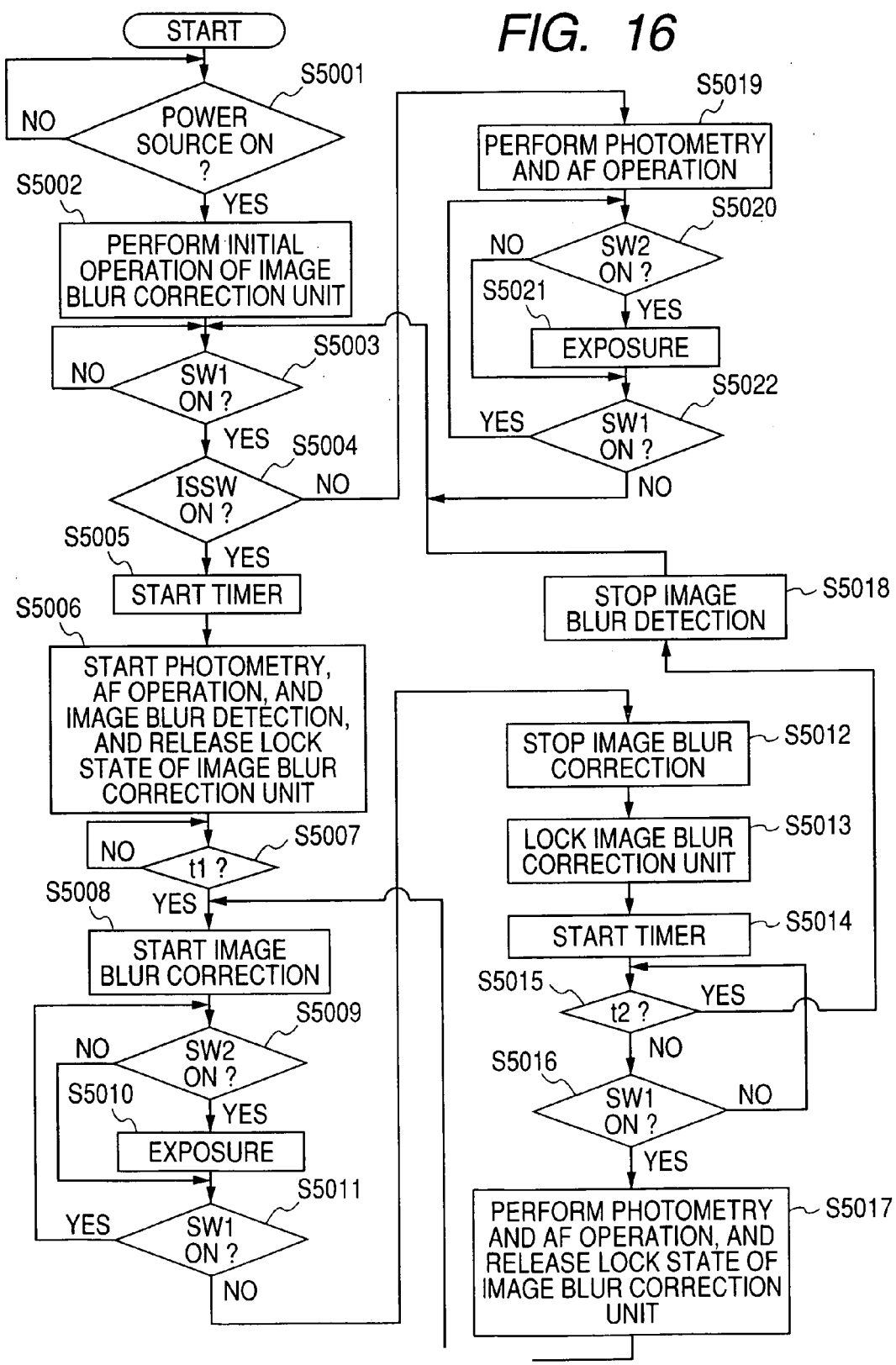
FIG. 16 is an operation flow chart of the lens exchange type AF single-lens reflex camera system.

FIG. 16 is a flow chart showing a main operation in the lens system and the camera system shown in FIG. 15. Note that "Y" described in the figure means YES, and "N" described therein means NO. First of all, when the power source switch 203 of the camera main body 200 is turned ON and it is discriminated that an electric power is started to be supplied from a power source to the lens main body 300 (or when an old battery is exchanged for new one or when the lens main body 300 is installed to the camera main body 200, the communication is started between the camera main body 200 and the lens main body 300)(S5001), the lens CPU 301 energizes the image blur correction unit 305 to carry out an initial operation for the image blur correction unit 305.

While the details of the initial operation will be described (later) after the mechanical construction of the image blur correction device of the present invention is described, an outline thereof is given here. The initial operation is a processing for setting a lock member (a member for locking the hold frame of the image blur correction optical unit) of the lock mechanism of the image blur correction unit 305 in a predetermined position. Thus, the initial operation processing is a processing for necessarily driving the lock mechanism upon turn-ON of the power source to set the lock member in a predetermined reference position in order to cope with a case where the position of the lock member of the lock mechanism is shifted owing to cutoff of the supply of the electric power from the power source, application of a shock, or the like in the middle of driving of the lock mechanism so that the current lock state cannot be identified from the predetermined reference position.

For example, when a stepping motor (pulse drive motor) is used as a drive source for the lock drive mechanism, since the lock member of the lock mechanism is caused to reach a target position by controlling the number of drive pulses from the predetermined reference position to the target position, if the predetermined reference position (how many pulses the lock member of the lock drive mechanism has to be shifted from the reference position up to the current position) is not found out, then it becomes impossible to calculate the precise number of pulses up to the target position. For this reason, an operation for determining a predetermined reference position is required. Next, the camera CPU 201 judges whether or not the signal SW1 is generated through the release switch 204 (S5003). When the judgment results show that the signal SW1 is generated through the release switch 204, the lens CPU 301 judges whether or not the IS switch 303 is in a turn-ON state (whether or not the IS operation is selected) (S5004). When the judgment results show that the IS operation is selected, the operation proceeds to a processing of Step S5005. On the other hand, when the judgment results show that the IS operation is not selected, the operation proceeds to a processing of Step S5019.

In Step S5005, the lens CPU 301 starts an internal timer, and next the camera CPU 201 instructs the photometry unit 205 and the focus detection unit 208 to carry out the photometry operation and the focal point detection operation, respectively. Then, the lens CPU 301 instructs the focus unit 306, the image blur correction unit 305, and the lock drive mechanism to start the focus operation, to start the image blur detection, and to release the lock state of the image blur correction optical system, respectively (S5006).

Next, the lens CPU 301 judges whether or not the count results in the internal timer show that it reaches predetermined time t1. When the lens CPU 301 judges that the count results in the internal timer show that it does not reach the predetermined time t1, the operation remains in this step until the control results in the internal timer show that it reaches the predetermined time t1 (S5007). This processing is a processing for standing by for a time period required for an output signal from the vibration detection circuit to be stabilized. After that, after a lapse of the predetermined time period of t1, the image blur correction optical system is driven by the drive mechanism of the image blur correction unit based on a target value signal obtained through the arithmetic operation from the output signal of the vibration detection circuit, and the output signal from the position detection circuit to start the control for the image blur correction (S5008).

Next, the camera CPU 201 judges whether or not the signal SW2 is generated through the release switch 204 (S5009). When the judgment result's show that the signal SW2 is not yet generated through the release switch 204, the camera CPU 201 judges again whether or not the signal SW1 is generated through the release switch 204 (S5011). On the other hand, the judgment results show that the signal SW1 is also not generated through the release switch 204, the lens CPU 301 stops the image blur correction control (S5012), and drives the lock mechanism to lock the image blur correction optical system to the predetermined position (optical axis central position).

In addition, when while it is judged in Step S5009 that the signal SW2 is not yet generated through the release switch 204, it is judged in Step S5011 that the signal SW1 is already generated through the release switch 204, the operation returns back to the processing of Step S5009. Then, when it is judged in Step S5009 that the signal SW2 is generated through the release switch 204, the lens CPU 301 controls the stop unit 307, and at the same time, the camera CPU 201 instructs the exposure unit 206 to carry out an exposure operation for the image pickup unit 207 (S5010).

Next, the camera CPU 201 checks the state of the signal SW1 (S5011). When the camera CPU 201 judges that the signal SW1 is not generated any more, the lens CPU 301 stops the image blur correction control (S5012), and drives the lock drive mechanism to lock the image blur correction optical system to the predetermined position (optical axis central position).

After completion of the above-mentioned operation, next, the lens CPU 301 resets the internal timer once to start the internal timer again (S5014), and judges whether or not the signal SW1 is generated within a predetermined time period of t2 again. When the judgment results show that the signal SW1 is generated within the predetermined time period of t2 again after the image blur correction is stopped, the photometry, the AF (the focal point detection operation and the focus operation), and the release of the lock state of the image blur correction optical system are carried out (S5017). Since the image blur detection is continued as it is, the image blur correction optical system is immediately driven based on the target value signal and the output signal from the position detection circuit to start the image blur correction control again (S5008). Hereinafter, the same operation as that described above is repeated.

Execution of such a processing for judging whether or not the predetermined time period of t2 has elapsed makes it possible to remove such inconvenience that when a photographing person carries out the release manipulation again after he/she stops the release manipulation, he/she must stand by until the output signal of the vibration detection circuit is stabilized after the vibration detection circuit is activated on all such occasions.

On the other hand, when the judgment results show that the signal SW1 is not yet generated within the predetermined time period of t2 after the image blur correction is stopped (S5015), the operation of the vibration detection circuit is stopped (S5018). After that, the operation returns back to the processing of Step S5003 to enter the state of waiting for generation of the signal SW1.

When it is judged in Step S5004 that the IS operation is not selected, the camera CPU 201 instructs the photometry unit 205 and the focus detection unit 200 to carry out the photometry operation and the focal point detection operation, respectively, and the lens CPU 301 instructs the focus unit 306 to carry out the focus operation (S5019). Next, the camera CPU 201 judges whether or not the signal SW2 is generated through the release switch 204 (S5020). When the judgment results show that the signal SW2 is not yet generated through the release switch 204, the camera CPU 201 judges again whether or not the signal SW1 is already generated through the release switch 204 (S5022). When the judgment results show that even the signal SW1 is not yet generated through the release switch 204, the operation returns back to the processing of Step S5003 to enter the state of waiting for generation of the signal SW1. In addition, when the camera CPU 201 judges in S5022 that while the signal SW2 is not yet generated, the signal SW1 is already generated, the operation returns back to the processing of Step S5020. Then, when the camera CPU 201 detects in Step S5020 that the signal SW2 is generated through the release switch 204, the lens CPU 301 controls the stop unit 307, and at the same time, the camera CPU 201 controls the exposure unit 206, thereby starting the exposure operation for the image pickup unit 207 (S5021). Next, when the camera CPU 201 checks the state of the signal SW1 (S5022) to judge that the signal SW1 is not yet generated, the operation returns from the processing of Step S5022 back to the processing of Step S5003.

In the camera system in this embodiment of the present invention, the above-mentioned series of processings are repeatedly executed until the power source switch 203 is turned OFF. Upon turn-OFF of the power source switch 203, the communication between the camera CPU 201 and the lens CPU 301 ends to complete the supply of the electric power from the power source to the lens main body 300.

Figure 1:
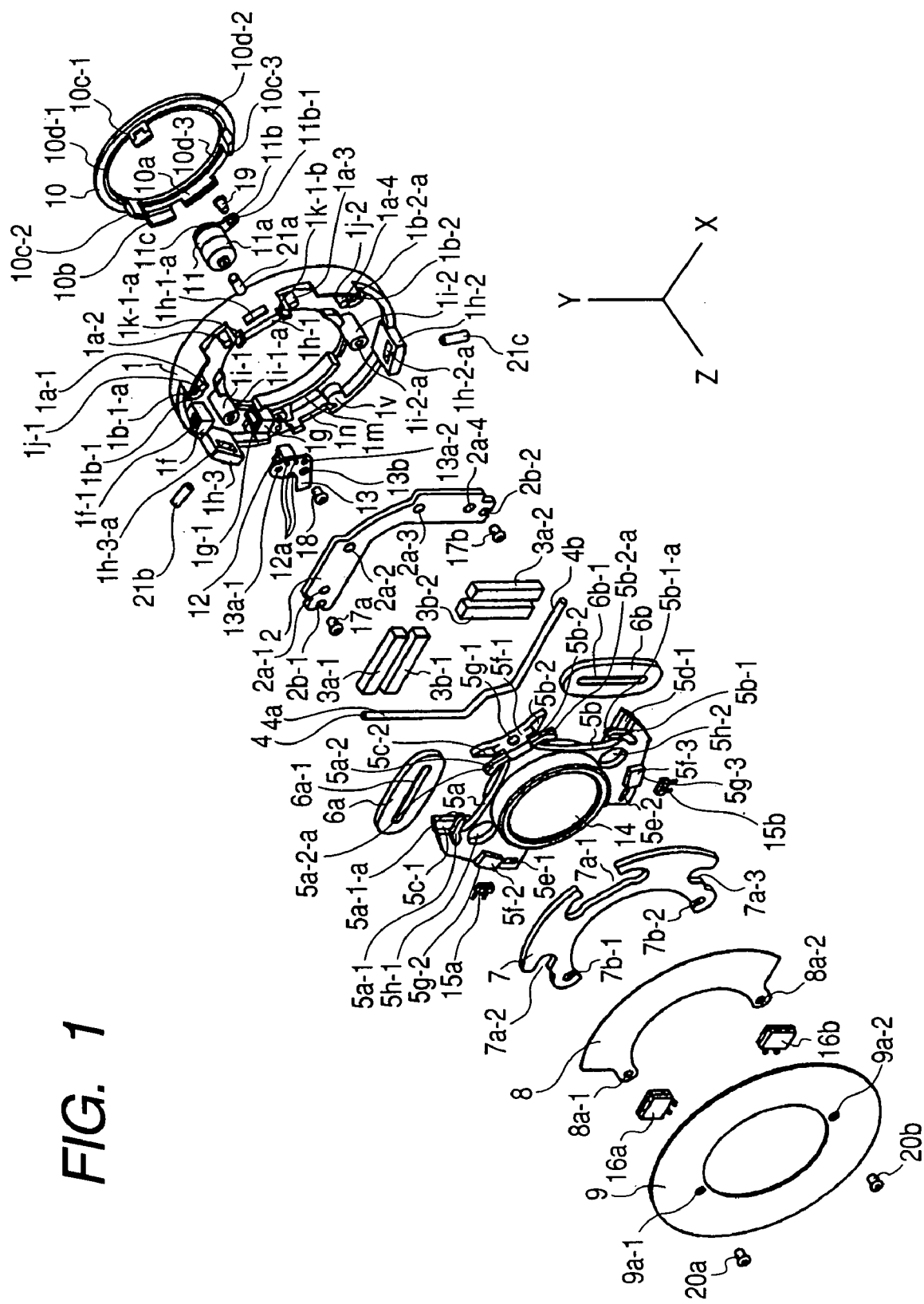
FIG. 1 is an exploded perspective view of an image blur correction unit according to an embodiment of the present invention.

Next, a description will hereinafter be given with respect to a mechanical construction of the image blur correction unit 305 of the present invention. First of all, an outline of each of components and parts will now be given. FIG. 1 is an exploded perspective view of the image blur correction unit of the present invention. Reference numeral 1 designates a base member made of a synthetic resin, reference numeral 2 designates a first yoke member made of a steel plate having large magnetic permeability, and reference numeral 3 designates a permanent magnet constituted by four rectangular parallelepiped permanent magnets 3a-1, 3b-1, 3a-2, and 3b-2.

Reference numeral 4 designates a guide member which is formed by bending a metallic wire rod and which has a first guide portion 4a and a second guide portion 4b. Reference numeral 5 designates a lens hold frame (firs movable member) which is made of a synthetic resin material and which holds an image blur correction lens 14. Reference numerals 6a and 6b designate coils each of which is made of a lead wire, reference numeral 7 designates a second yoke member made of a steel plate having large magnetic permeability, and reference numeral 8 designates an insulating plate made of a synthetic resin having high electrical insulating property. Reference numeral 9 designates an electrical circuit board to which electrical components and parts of an image blur correction control unit are mainly mounted, reference numeral 10 designates a lock ring (second movable member) as a lock mechanism which is made of a synthetic resin and which serves to mechanically lock the movement of the lens hold frame 5 in a correction operation direction, and reference numeral 11 designates an actuator which serves to drive the lock ring 10 and for which a stepping motor (pulse drive motor) is adopted.

Reference numeral 12 designates a photo-interrupter (second detection means) for detecting a position of the lock ring 10, reference numeral 13 designates a flexible printed wiring board, reference numerals 15a and 15b designate light emitting elements, reference numerals 16a and 16b designate light receiving elements (first detection means) for receiving light beams emitted from the light emitting elements 15a and 15b, respectively, reference numerals 17 to 20 designate fastening members, and reference numerals 21a to 21c designate support axes each of which is made of a metallic wire rod.

Next, a description will hereinafter be given with respect to details of the components and the parts and interrelationships among the components and the parts. First of all, the first yoke member 2 is mounted to the base member 1. In the mounting, projection axis portions 1a-1 to 1a-4 provided in the base member 1 are engaged with hole portions 2a-1 to 2a-4 bored through the first yoke member 2, respectively. In addition, an end face of the first yoke member 2 is caused to abut against abutment surface portions 1b-1 and 1b-2 provided in the base member 1, the fastening members 17a and 17b are inserted through groove portions 2b-1 and 2b-2 of the first yoke member 2, respectively, and the fastening members 17a and 17b are then engaged with hole portions 1b-1-a and 1b-2-a of the base member 1 to fix the first yoke member 2 to the base member 1.

Figure 2:
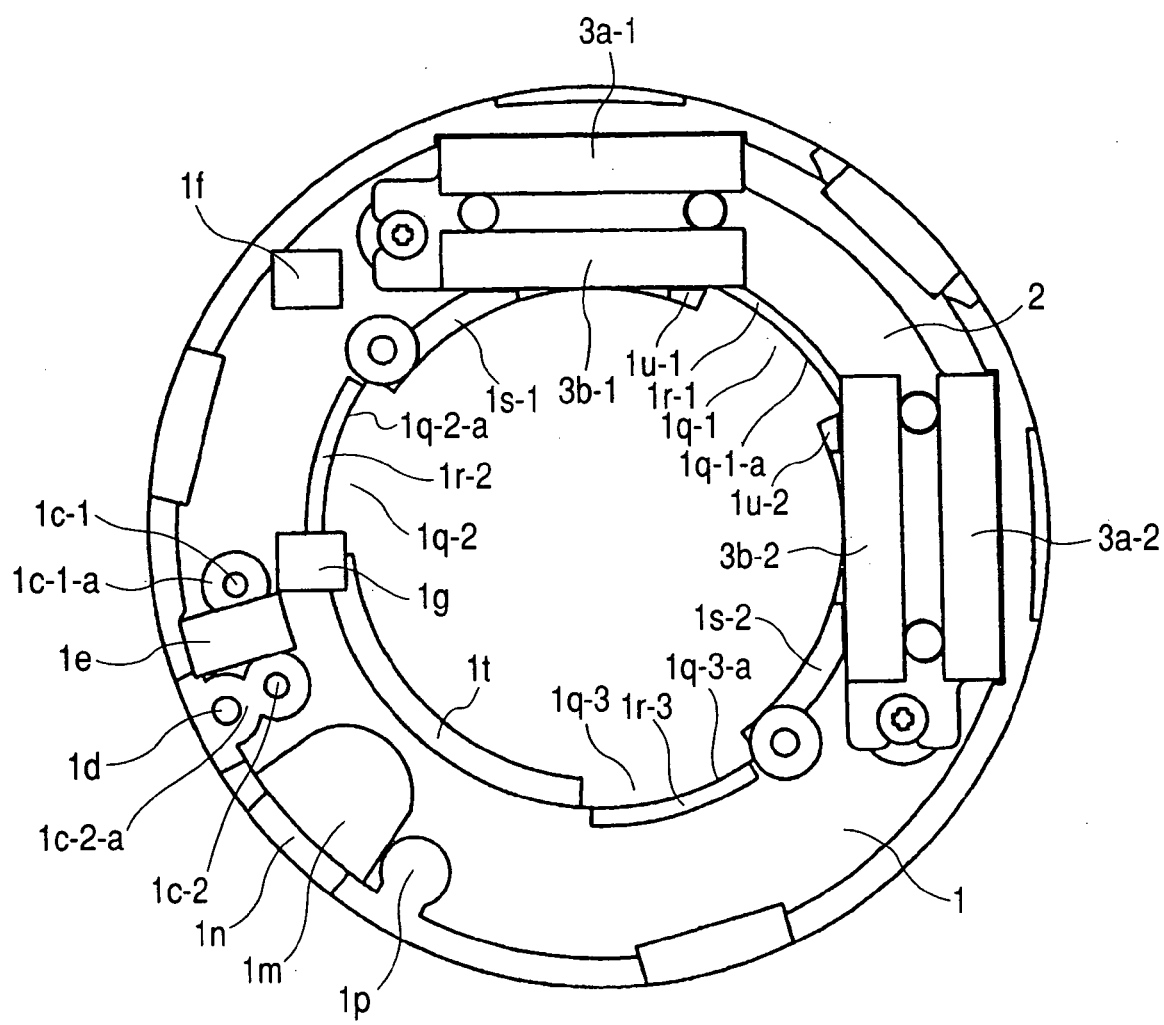
FIG. 2 is a view showing a state in the middle of assembly of the image blur correction unit according to the embodiment of the present invention.

Next, the permanent magnet 3 is installed to the first yoke member 2. In this installation, the permanent magnets 3a-1, 3b-1, 3a-2, and 3b-2 are disposed so that the projection axis portions 1a-1 and 1a-2, and 1a-3 and 1a-4 of the base member 1 are sandwiched between the permanent magnets 3a-1 and 3b-1, and 3a-2 and 3b-2, respectively. A state of the installation of those components and parts is shown in FIG. 2. The permanent magnet 3 installed to the first yoke member 2 is strongly held by the first yoke member 2 owing to its magnetic attractive force.

Next, the photo-interrupter 12 is fixed to the flexible printed wiring board 13 by soldering terminal portions 12a to corresponding portions of the flexible printed wiring board 13. Then, the projection axis portions 1c-1 and 1c-2 provided in the base member 1 are engaged with the hole portions 13a-1 and 13a-2 of the flexible printed wiring board 13, the end face of the flexible printed wiring board 13 is caused to abut against the abutment surface portions 1c-1-a and 1c-2-a of the base member 1, a fastening member 18 is inserted into a hole portion 13b of the flexible printed wiring board 13 to be engaged with a hole portion 1$d$ of the base member 1, thereby fixing the flexible printed wiring board 13 to the base member 1.

In the fixing, the photo-interrupter 12 is inserted through a hole portion 1$m$ of the base member 1. Note that when a reinforcing plate is provided on the end face portion of the flexible printed wiring board 13 which is caused to abut against the abutment surface portions 1$c$-1-$a$ and 1$c$-2-$a$ of the base member 1, the position of the photo-interrupter 12 is stabilized. Note that the terminals 12$a$ of the photo-interrupter 12 are connected to the electrical circuit board 9 through the flexible printed wiring board 13.

Next, the first guide portion 4$a$ of the guide member 4 is engaged with engagement hole portions 1$f$-1 and 1$g$-1 of engagement column portions if and 1$g$ provided in the base member 1.

Next, the coils 6$a$ and 6$b$ are mounted to the lens hold frame 5. In the mounting, the coils 6$a$ and 6$b$ are sandwiched between elastically deformable hold piece portions 5$a$-1 and 5$a$-2, and 5$b$-1 and 5$b$-2, and hold clip portions 5$c$-1 and 5$c$-2, and 5$d$-1 and 5$d$-2 which are all provided in the lens hold frame 5 to be held, thereby limiting the relative movement of the coils 6$a$ and 6$b$ in the optical axis direction with respect to the lens hole frame 5.

In addition, the hold piece portions 5$a$-1, 5$a$-2, 5$b$-1, and 5$b$-2 have engagement projection portions at their tip portions. Those engagement projection portions are engaged with long hole portions 6$a$ -1 and 6$b$ -1 of the coils 6$a$ and 6$b$, thereby limiting the relative movement of the coils 6$a$ and 6$b$ in the optical axis direction and in the direction intersecting perpendicularly the optical axis with respect to the lens hold frame 5, respectively.

Next, the light emitting elements 15$a$ and 15$b$ are mounted to the lens hold frame 5 by the thermal caulking or the like. The light beams emitted from the light emitting elements 15$a$ and 15$b$ pass through long hole portions 5$e$-1 and 5$e$-2 bored through the lens hold frame 5.

Note that the terminals of the coils 6$a$ and 6$b$, and the light emitting elements 15$a$ and 15$b$ are connected to the electrical circuit board 9 through a flexible printed wiring board (not shown) to carry out the image blur correction control.

Figure 3:
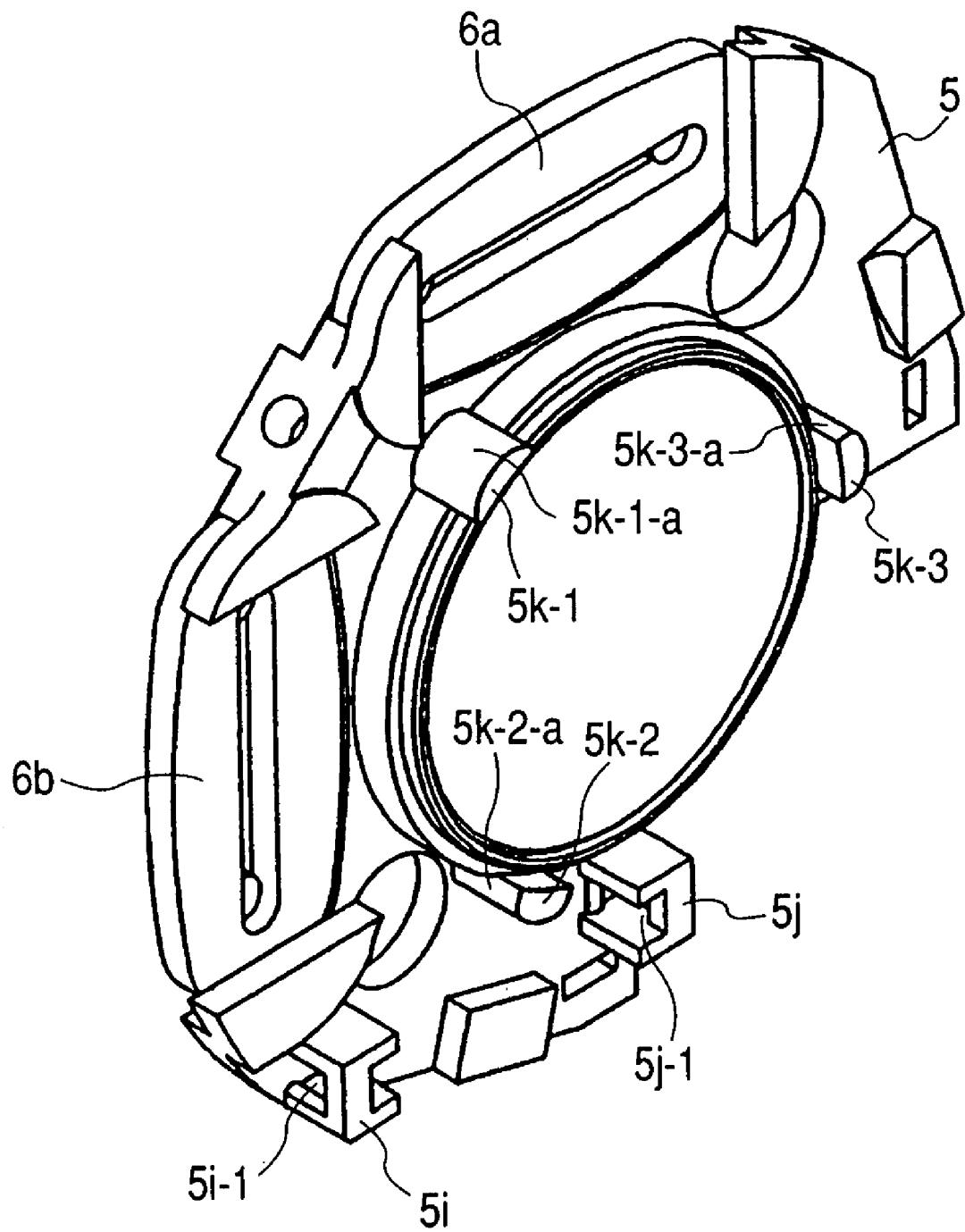
FIG. 3 is a perspective view of a lens hold frame of the image blur correction unit according to the embodiment of the present invention.

Next, the second guide portion 4$b$ of the guide member 4 is engaged with engagement hole portions 5$i$-1 and 5$j$-1 (refer to FIG. 3) of the engagement column portions 5$i$ and 5$j$ provided in the lens hold frame 5. Next, support axes 21$a$ to 21$c$ are mounted to hole portions 5$g$-1 to 5$g$-3 of the lens hold frame 5 by the press fitting or the like. In the mounting, since the support axes 21$a$ to 21$c$ are engaged with long hole portions 1$h$-1-$a$ to 1$h$-3-$a$ bored through projection piece portions 1$h$-1 to 1$h$-3 of the base member 1, respectively, the movement of the lens hold frame 5 in the optical axis direction with respect to the base member 1 is limited.

The first guide portion 4$a$ of the guide member 4 is engaged with the base member 1, the second guide portion 4$b$ of the guide member 4 is engaged with the lens hold frame 5, and the support axes 21$a$ to 21$c$ are engaged with the long hole portions 1$h$-1-$a$ to 1$h$-3-$a$ of the base member 1, respectively, whereby the lens hold frame 5 is limited in rotation around the optical axis and in movement in the optical axis direction, and hence can move only in a pitch direction (in a Y-axis direction in the figure) and in a yaw direction (in an X-axis direction in the figure).

Axis portions 1$i$-1 and 1$i$-2 provided in the base member 1 are inserted through hole portions 5$h$-1 and 5$h$-2 bored through the lens hold frame 5. In this case, a diameter of each of the hole portions 5$h$-1 and 5$h$-2 is set larger than that of each of the axis portions 1$i$-1 and 1$i$-2. Thus, since inner peripheral surfaces of the hole portions 5$h$-1 and 5$h$-2 abut against the outer peripheral surfaces of the axis portions 1$i$-1 and 1$i$-2, respectively, a maximum amount of movement of the lens hold frame 5 in the pitch direction and in the yaw direction is limited. For example, there may also be adopted a construction in which the amount of movement is limited only by one pair of hold portion and axis portion, and the other pair of hold portion and axis portion is formed at an interval longer than a predetermined interval.

Next, the second yoke member 7 is mounted to the base member 1. In the mounting, an end face of the second yoke member 7 abuts against tip surface portions (all having the same height in the optical axis direction) of end face portions 1$j$-1, 1$j$-2, 1$k$-1-$a$, 1$k$-1-$b$, 1$i$-1, and 1$i$-2 of the base member 1 to determine a position of the second yoke member 7 in the optical axis direction with respect to the base member 1. Note that the groove portions 7$a$-1 to 7$a$-3 in the second yoke member 7 are provided for escape of the hold piece portions 5$a$-1, 5$a$-2, 5$b$-1, and 5$b$-2 of the lens hold frame 5.

Next, the light receiving elements 16$a$ and 16$b$ are mounted to the electrical circuit board 9 so as to be disposed in positions where the light receiving elements 16$a$ and 16$b$ can receive the light beams emitted from the above-mentioned light emitting elements 15$a$ and 15$b$, respectively. The electrical circuit board 9 is fastened to the base member 1 through the insulating plate 8. In the fastening, since the fastening members 20$a$ and 20$b$ are inserted through hole portions 9$a$-1, 8$a$-1, and 7$b$-1, and 9$a$-2, 8$a$-2, and 7$b$-2 of the electrical circuit board 9 to be engaged with hole portions 1$i$-1-$a$ and 1$i$-1-$b$ of the base member 1, respectively, the electrical circuit board 9, the insulating plate 8, and the second yoke member 7 are positioned with respect to the base member 1.

Next, a pinion 11$c$ is mounted to an output shaft portion of the stepping motor 11. Then, the fastening member 19 is inserted through a hole portion 11$b$-1 of a mounting plate portion 11$b$ mounted to the main body portion 11$a$ of the stepping motor 11 to be engaged with a mounting hole portion 1$p$-1 (reference numeral 1$p$ designates a projection-like portion through which a mounting hole is to be bored) bored through the base member 1, thereby fastening the stepping motor 11 to the base member 1. Note that a hole portion 1$m$ and a groove portion in the base member 1 are provided for escape of a motor main body and for escape of connection terminals of the stepping motor 11, respectively.

Figure 8:
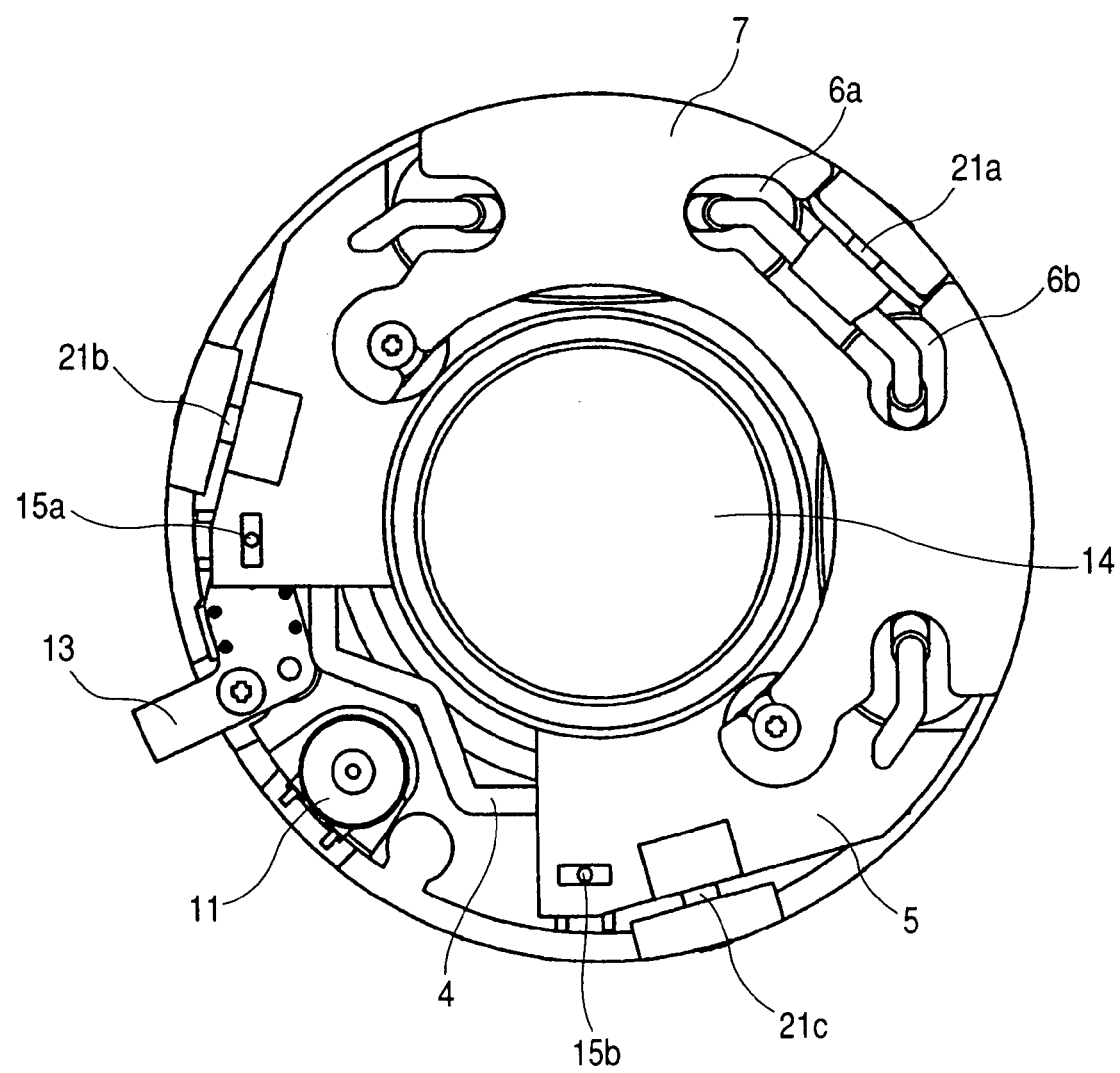
FIG. 8 is a view showing a state in the middle of assembly of the image blur correction unit according to the embodiment of the present invention.

A state of assembly of the above-mentioned components and parts is shown in FIG. 8. However, illustration of the electrical circuit board 9 and the insulating plate 8 is omitted in the figure for the sake of clear understanding of the assembly state.

Next, the lock ring 10 is mounted to the base member 1. Claw portions 10$c$-1-$a$ to 10$c$-3-$a$, and inclined face portions 10$c$-1-$e$ to 10$c$-3-$e$ are formed in elastically deformable projection pieces 10$c$-1 to 10$c$-3 provided in the lock ring 10, respectively (refer to FIG. 5). On the other hand, sliding surfaces 1$r$-1 to 1$r$-3 having nearly the same height as that of recess portions 1$q$-1 to 1$q$-3 in the optical axis direction are formed in the base member 1. In FIG. 2, reference numerals 1$t$, 1$s$-1, 1$s$-2, 1$u$-1, and 1$u$-2 designate reinforcing portions for suppressing deformation of the base member 1. Of those reinforcing portions 1$t$, 1$s$-1, 1$s$-2, 1$u$-1, and 1$u$-2, the reinforcing portions 1$s$-1, 1$s$-2, 1$u$-1, and 1$u$-2 serve as stoppers as well for limiting the movement of the permanent magnet 3 in the optical axis central direction.

Figure 6:
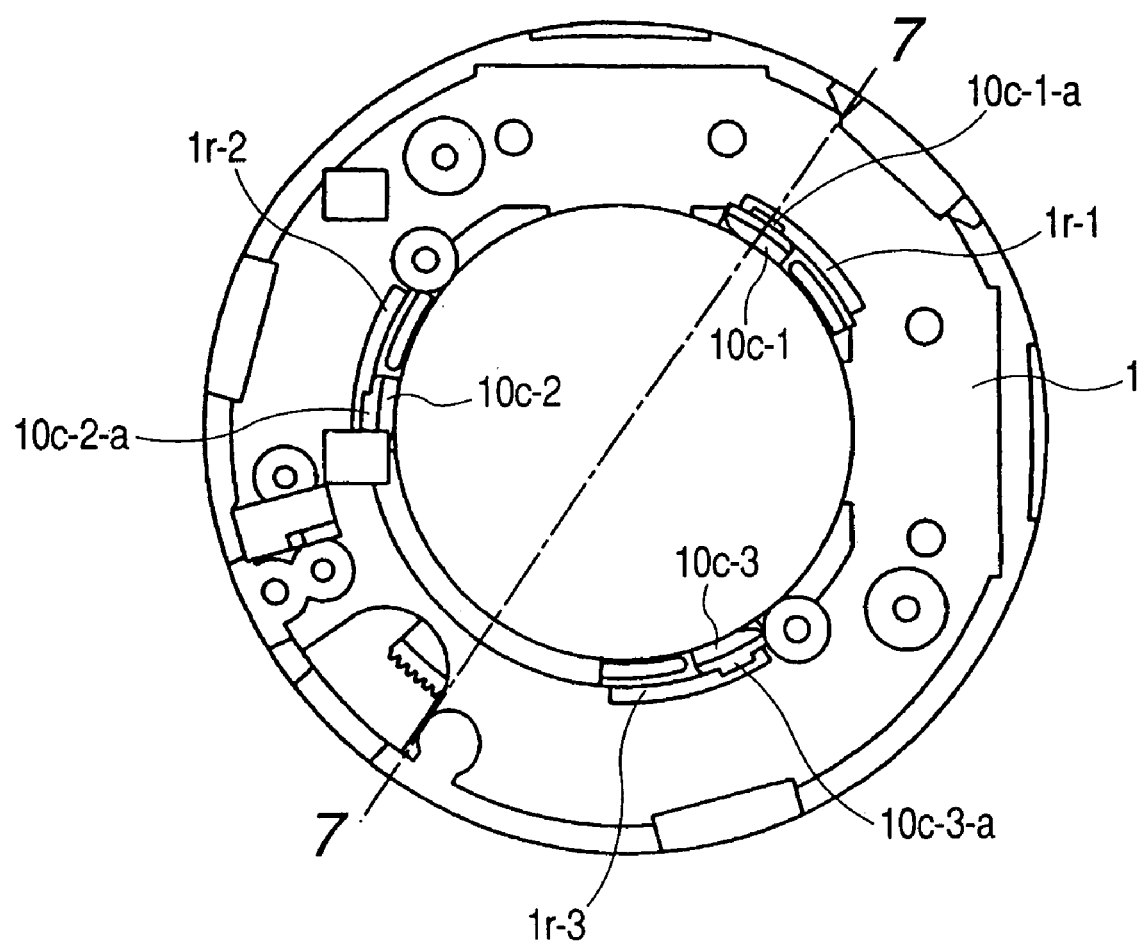
FIG. 6 is a view showing a state of assembly of the base member and the lock ring of the image blur correction unit according to the embodiment of the present invention.
Figure 7:
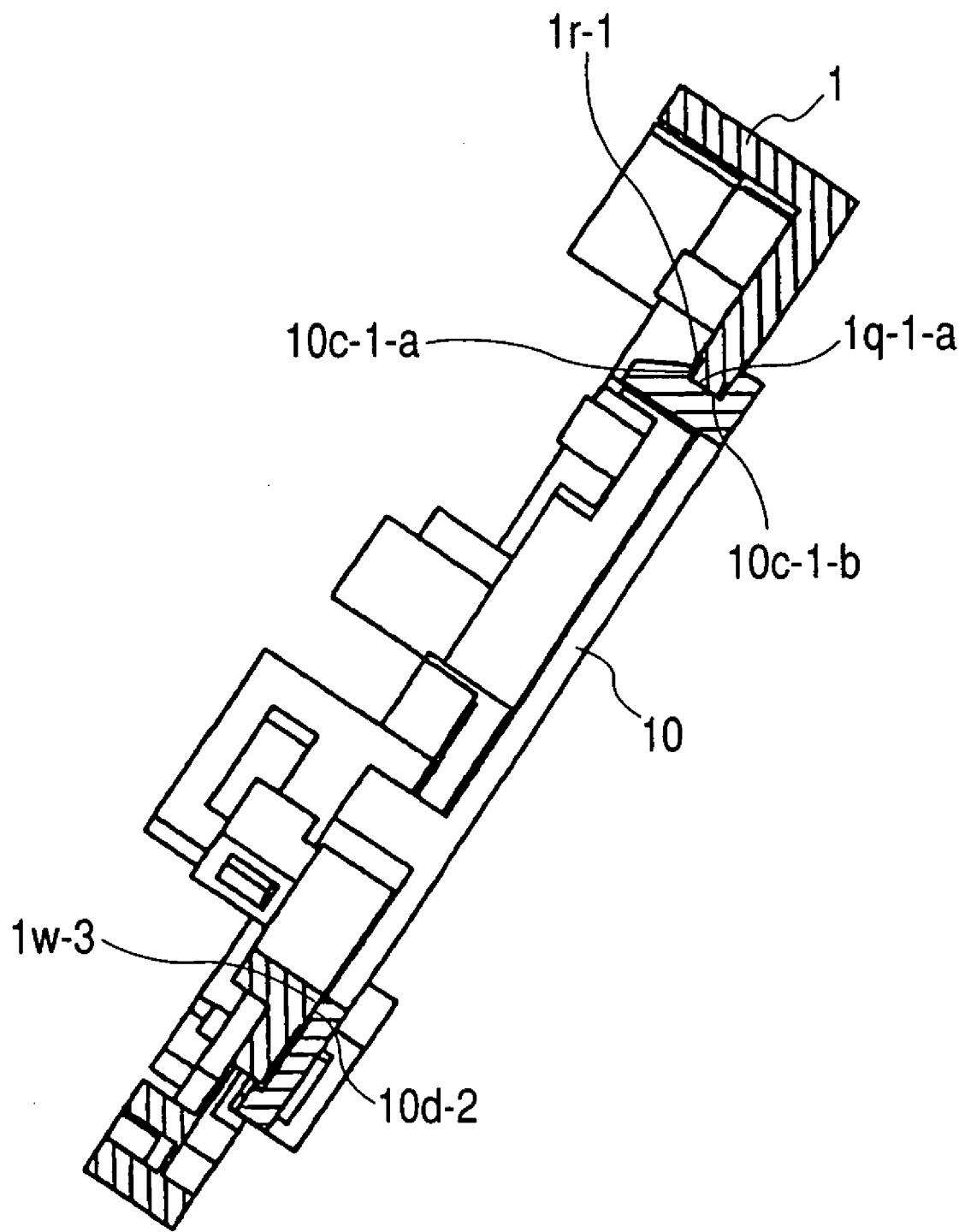
FIG. 7 is a cross sectional view taken along the line 7—7 of FIG. 6.

As the claw portions 10$c$-1-$a$ to 10$c$-3-$a$ of the lock ring 10 are aligned with the recess portions 1$q$-1 to 1$q$-3 of the base member 1, respectively, and both the parts are then brought close to each other in the optical axis direction, the projection piece portions 10c-1 to 10c-3 are elastically deformed to the optical axis side along the inclined surface portions 10c-1-e to 10c-3-e. As both the parts are further brought close to each other, the elastic deformation of the projection piece portions 10c-1 to 10c-3 is released (snap fitting) to complete the incorporation of the lock ring 10 in the base member 1. In this state, as shown in FIG. 7 (a cross sectional view taken along line 7—7 of FIG. 6), outer end face portions 10c-1-b to 10c-3-b of the projection piece portions 10c-1 to 10c-3 are engaged with recess end face portions (circular shaped portions with the optical axis as a center) 1q-1-a to 1q-3-a of the base member 1. Also, sliding surface portions 1w-1 to 1w-3 of the base member 1 come close to the sliding surface portions 10d-1 to 10d-3 (refer to FIG. 5) of the lock ring 10 in the optical axis direction, respectively, and end faces of the claw portions 10c-1-a to 10c-3-a nearly abut against the sliding surfaces 1r-1 to 1r-3, respectively. The lock ring 10 is limited in movement in the optical axis direction and in the direction intersecting perpendicularly the optical axis with respect to the base member 1 owing to this state, and hence can rotationally move with the optical axis as the rotation center. In addition, the lock ring 10 has an extension piece portion 10a, and a gear portion 10a-3 is formed in an outer end portion of the extension piece portion 10a. Thus, the pinion 11c of the stepping motor 11 is adapted to be engaged with the gear portion 10a-3 to transfer a driving force of the stepping motor 11 to the lock ring 10 (refer to FIG. 5).

In addition, the rotational movement of the lock ring 10 can limit the movement of the lens hold frame 5 in the direction intersecting perpendicularly the optical axis, or can release this limitation to the movement of the lens hold frame 5 in the direction intersecting perpendicularly the optical axis. This operation will be described in more detail below. The projection piece portions 10c-1 to 10c-3 of the lock ring 10 have cam surface portions 10c-1-c to 10c-3-c, and engagement surface portions (circular surface portions with the optical axis as a center) 10c-1-d to 10c-3-d, respectively. In addition, the lens hold frame 5 has engagement surface portions (surface portions each of which has nearly a semi-circular cylinder shape and which are disposed on a circumference with the optical axis as a center) 5k-1-a to 5k-3-a of the engagement claw portions 5k-1 to 5k-3 (refer to FIG. 3). In a state where the lens hold frame 5 is not limited in movement in the optical axis direction and in the direction intersecting perpendicularly the optical axis (hereinafter referred to as "an unlock region" for short), the engagement surface portions 5k-1-a to 5k-3-a abut against no portion. Thus, the inner peripheral surfaces of the hole portions 5h-1 and 5h-2 abut against the outer peripheral surfaces of the axis portions 1i-1 and 1i-2, whereby the lens hold frame 5 is limited in movement in the pitch direction and in the yaw direction.

On the other hand, as the stepping motor 11 is driven from the unlock region to rotationally move the lock ring 10 (the rotational movement in a counterclockwise direction when viewed from a subject side in FIG. 1), the engagement surface portions 5k-1-a to 5k-3-a come to abut against the cam surface portions 10c-1-c to 10c-3-c, respectively, and hence the lens hold frame 5 moves so as to follow the shapes of the cam surface portions 10c-1-c to 10-c-3-c.

Moreover, as the lock ring 10 is rotationally moved, the state of the engagement surface portions 5k-1-a to 5k-3-a changes from the state of abutting against the cam surface portions 10c-1-c to 10c-3-c to the state of abutting against the engagement surface portions 10c-1-d to 10c-3-d. In this state, since a diameter obtained from the connection of the abutment portions of the engagement surface portions 5k-1-a to 5k-1-a nearly agrees with a diameter obtained from the connection of the engagement surface portions 10c-1-d to 10c-3-d, the lens hold frame 5 is limited in movement in the direction intersecting perpendicularly the optical axis (hereinafter referred to as "a lock region" for short). Note that the lock region corresponds to a first region described in claims, and the unlock region corresponds to a second region described in claims.

Figure 4:
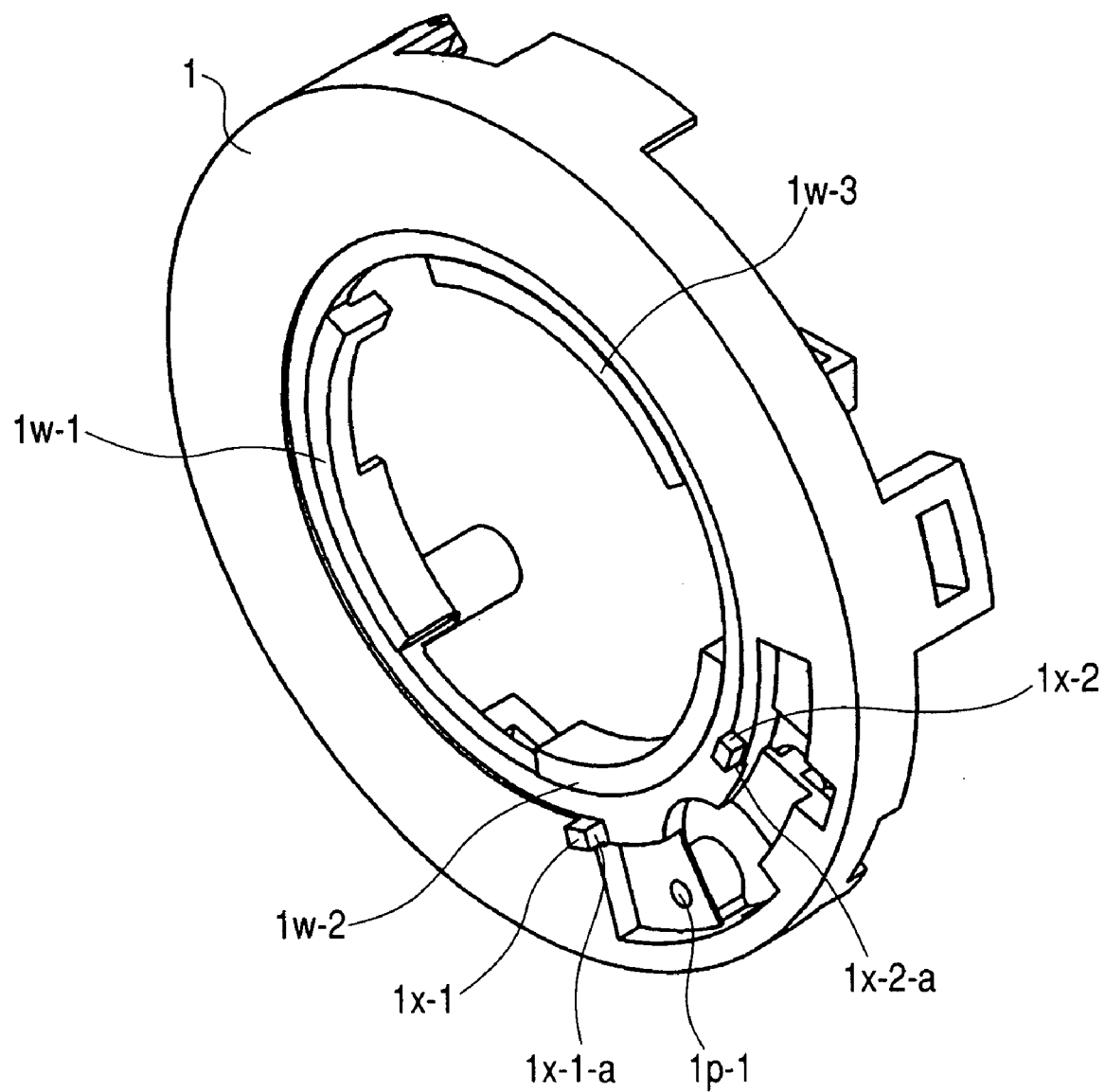
FIG. 4 is a perspective view of a base member of the image blur correction unit according to the embodiment of the present invention.

In addition, the rotational movement of the lock ring 10 in the lock and unlock directions is limited within a predetermined range. That is to say, as shown in FIG. 4, when in projection portions 1x-1 and 1x-2 of the base member 1 and both end surfaces 10a-1 and 10a-2 of the extension piece 10a of the lock ring 10, the end face 10a-1 abuts against a mechanical end 1x-1-a of the extension portion 1x-1, a mechanical rotation block state (a state shown in FIG. 9) in the lock region is provided, and when the end surface 10a-2 abuts against a mechanical end 1x-2-a of the projection portion 1x-2, a mechanical rotation block state (a state shown in FIG. 10) in the unlock region is provided.

Figure 5:
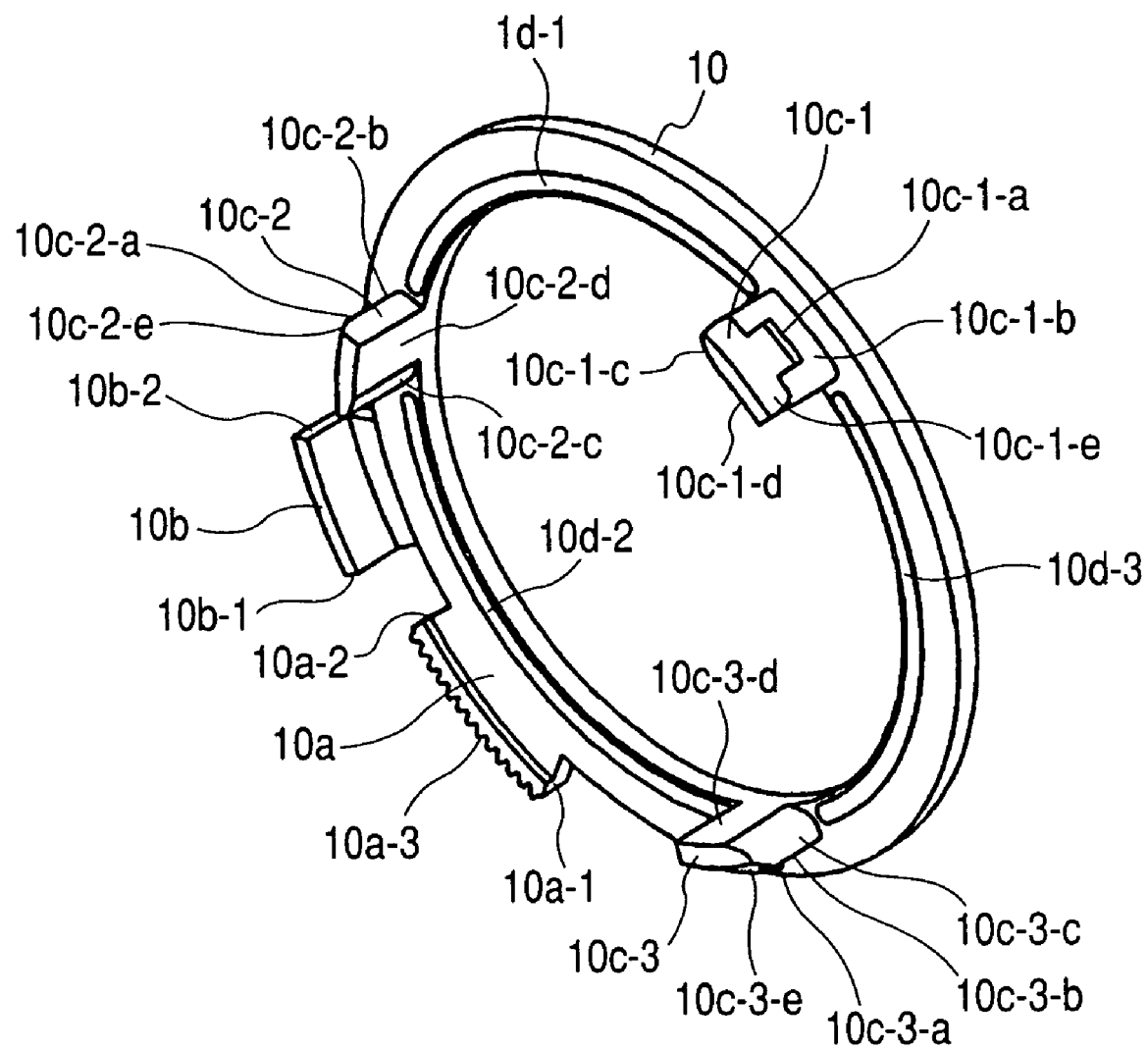
FIG. 5 is a perspective view of a lock ring of the image blur correction unit according to the embodiment of the present invention.
Figure 13:
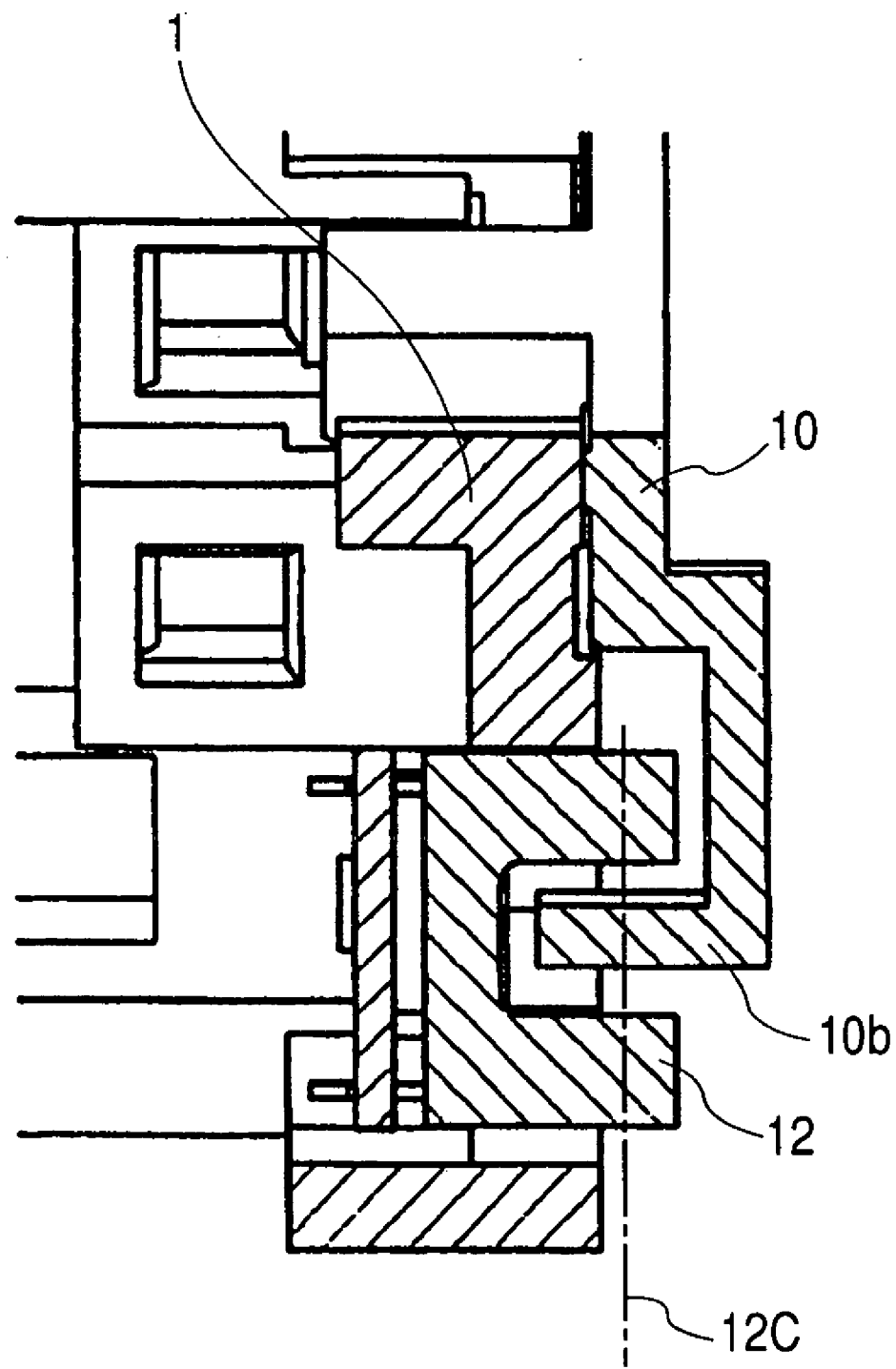
FIG. 13 is a cross sectional view explaining a positional relationship between the photo-interrupter and the lock ring of the image blur correction unit according to the embodiment of the present invention.

In addition, the lock ring 10 has a bend piece portion 10b which is provided in the position where the above-mentioned photo-interrupter 12 is engaged with the bend piece portion 10b (refer to FIG. 5). This will be described in more detail below. In a state where the lock ring 10 is perfectly incorporated in the base member 1, as shown in FIG. 13, the bend piece portion 10b and the photo-interrupter 12 show a positional relationship in which the bend piece portion 10b overlaps in the optical axis direction a sensor position 12C (a sensor portion is disposed on a line 12C) of the photo-interrupter 12 in the optical axis direction.

Figure 9:
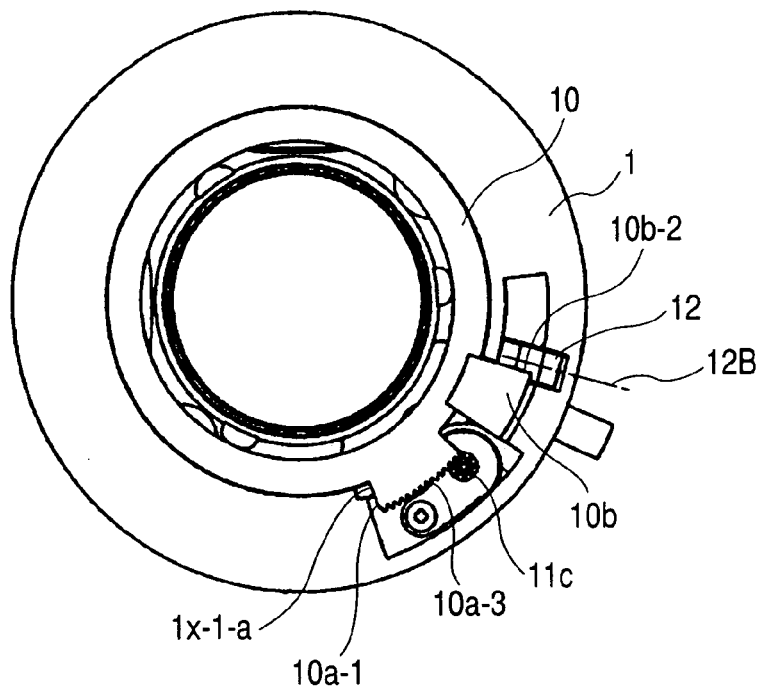
FIG. 9 is a view explaining a positional relationship between a photo-interrupter and the lock ring of the image blur correction unit according to the embodiment of the present invention.
Figure 10:
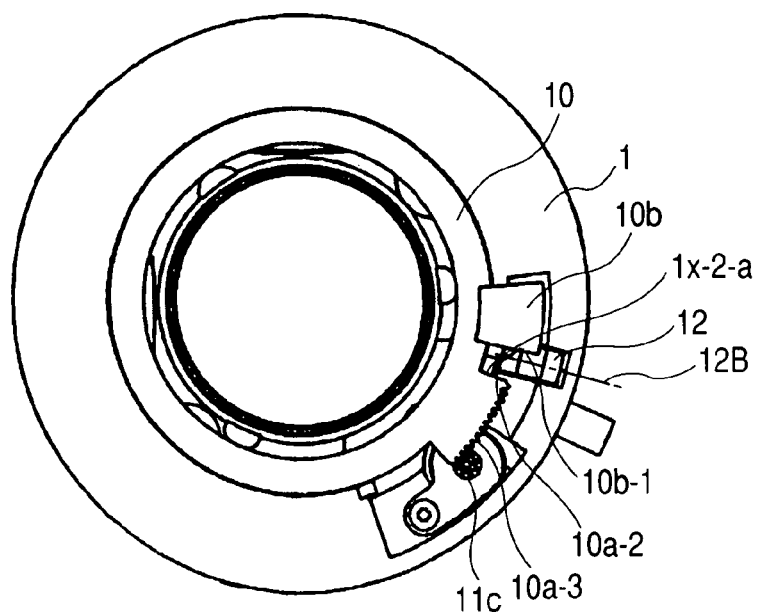
FIG. 10 is a view explaining a positional relationship between the photo-interrupter and the lock ring of the image blur correction unit according to the embodiment of the present invention.

In addition, as shown in FIGS. 9 and 10, in a state where in the lock region and the unlock region, the lock ring 10 abuts against the mechanical ends 1x-1-a and 1x-2-a, the bend piece portion 10b avoids interrupting a sensor portion 12B (the sensor portion is disposed on a line 12B) of the photo-interrupter 12 when viewed from the optical axis direction.

Figure 11:
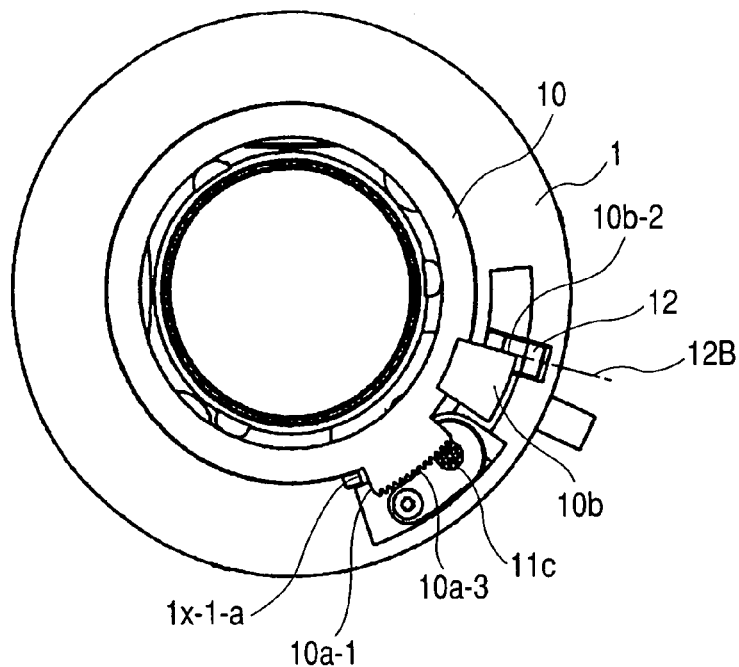
FIG. 11 is a view explaining a positional relationship between the photo-interrupter and the lock ring of the image blur correction unit according to the embodiment of the present invention.
Figure 12:
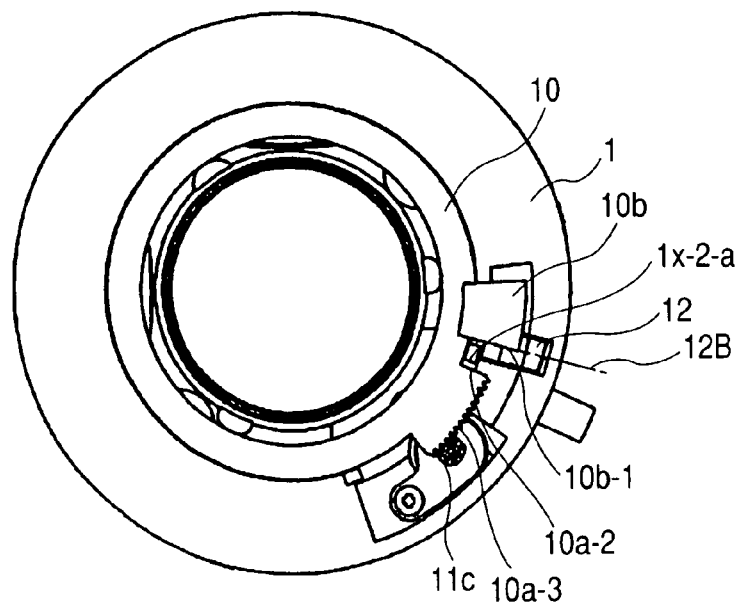
FIG. 12 is a view explaining a positional relationship between the photo-interrupter and the lock ring of the image blur correction unit according to the embodiment of the present invention.

In addition, as shown in FIGS. 11 and 12, in a state where in the lock region and the unlock region, the lock ring 10 is located slightly in front of the mechanical ends 1x-1-a and 1x-2-a, the end surface portion 10b-1 and 10b2 of the bend piece portion 10b are set in boundary positions where the bend piece portion 10b barely avoid interrupting a sensor portion 12B (the sensor portion is disposed on the line 12B) of the photo-interrupter 12 when viewed from the optical axis direction.

Figure 14:
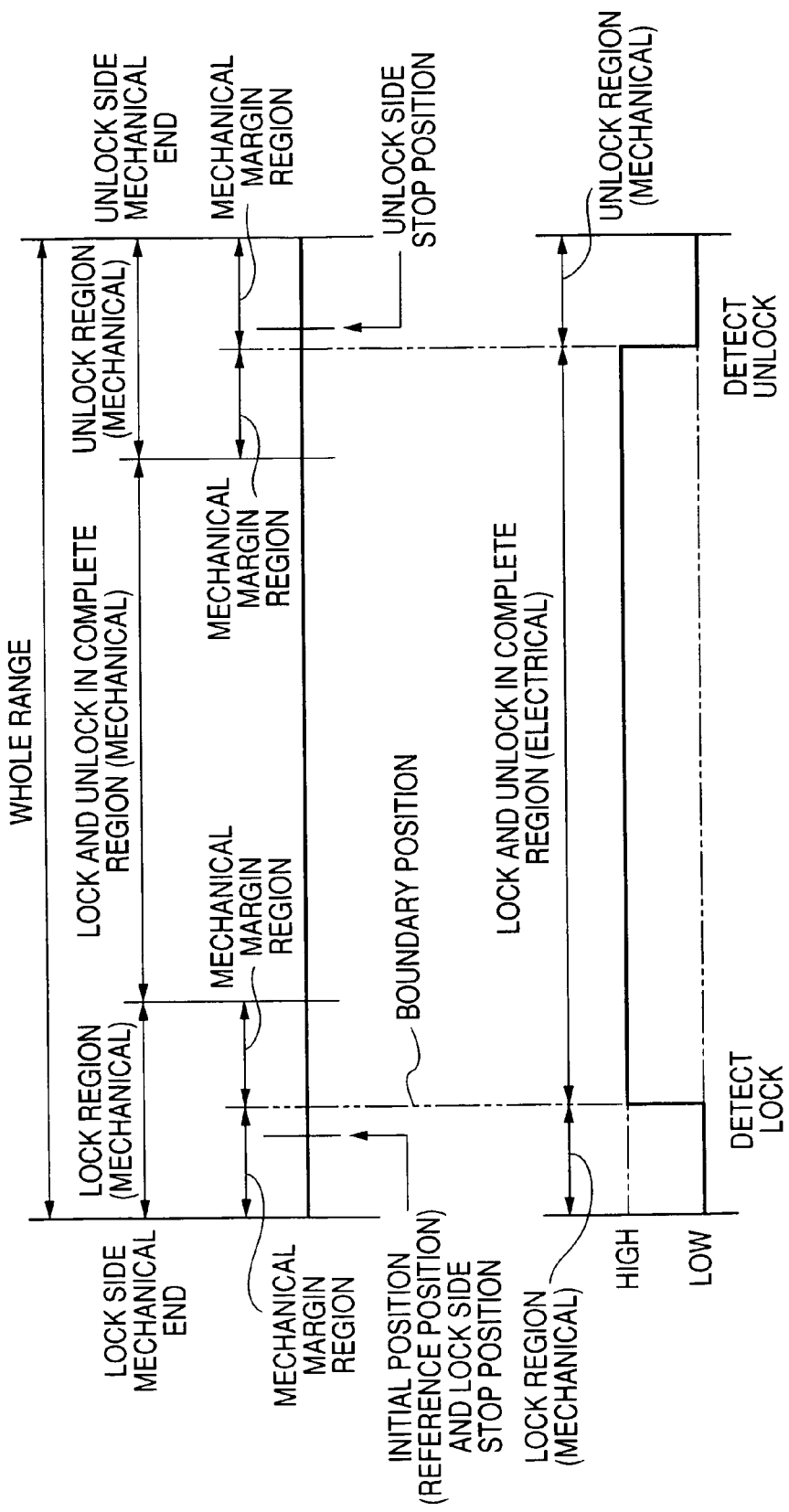
FIG. 14 is a diagram showing a mechanical construction and an electrical configuration of a lock mechanism of the image blur correction unit according to the embodiment of the present invention.

A diagram of the above-mentioned mechanical construction is expressed as shown in FIG. 14. A mechanical rotation block range, as a whole range, in the lock state and the unlock state is classified into a mechanical lock region, a mechanical unlock region, and a mechanical lock and unlock incomplete region.

Then, the boundary positions where the bend piece portion 10b barely avoid interrupting the sensor portion 12B (the sensor portion is disposed on the line 12B) of the photo-interrupter 12 when viewed from the optical axis direction exist in the lock region and the unlock region. In FIG. 14, those boundary positions are expressed in the form of dashed lines.

In addition, in terms of an output signal of the photo-interrupter 12, as shown in FIG. 14, the level of the output signal changes from High to Low or from Low to High in the boundary position. In terms of an electrical level, when the output signal is at a High level, the electrical lock and unlock incomplete region is obtained while when the output signal is at a Low level, the lock region or the unlock region is obtained.

The reason that the electrical lock region or the electrical unlock region is set within the mechanical lock region or the mechanical unlock region as shown in FIG. 14 is that an error in judgment with respect to the lock and the unlock due to the mechanical and dimensional errors of the components and parts is avoided. When for example, the sensor position of the photo-interrupter 12 is aligned with the boundary position between the mechanical lock region and the mechanical lock and unlock incomplete region, the region concerned is judged to be the electrical lock region in some cases owing to the mechanical and dimensional error of the components and parts though the region concerned is actually the mechanical lock and unlock incomplete region. In order to avoid this problem, the mechanical margin regions are set in the mechanical ends 1x-1-a and 1x-2-a of the electrical lock region and the electrical unlock region, and the sides opposite thereto, respectively (refer to FIG. 14).

Note that while in this embodiment, the photo-interrupter is used as the position detector for the lock ring 10, any other sensor may be used as long as this sensor can detect the position of the lock ring 10. That is to say, the output signal has to change in level in front of each of the mechanical ends 1x-1-a and 1x-2-a of the electrical lock region and the electrical unlock region, and thus the lock ring 10 has to be controlled based on a change in level of the output signal.

Now, according to the above-mentioned construction, a magnetic circuit is formed by the coils 6a and 6b, the permanent magnet 3, and first and second yoke members 2 and 7. Thus, the coil 6a is energized to allow the lens hold frame 5 to move in the pitch direction (in the Y-axis direction in FIG. 1), and the coil 6b is energized to allow the lens hold frame 5 to move in the yaw direction (in the X-axis direction in FIG. 1). In addition, both the coils 6a and 6b are energized to allow the lens hold frame 5 to move in a composite direction obtained by composing the pitch direction and the yaw direction with each other. Then, the values of the currents caused to flow through the coils 6a and 6b are changed to allow the lens hold frame 5 to move to an arbitrary position within the movement range.

Moreover, the light emitting elements 15a and 15b are mounted to the lens hold frame 5 so that the light beams emitted from the light emitting elements 15a and 15b can be received by the light receiving elements 16a and 16b, respectively. Hence, the positions of the lens hold frame 5 in the pitch direction and in the yaw direction can be detected (the position of the lens hold frame 5 in the yaw direction can be detected by the combination of the light emitting element 15a and the light receiving element 16a, and the position of the lens hold frame 5 in the pitch direction can be detected by the combination of the light emitting element 15b and the light receiving element 16a).

Note that, while not described in the above-mentioned construction, one terminals of the coils 6a and 6b, and one terminals of the light emitting elements 15a and 15b are connected to one end of the flexible printed wiring board 13 or the like, and the other terminals thereof are connected to the electrical circuit board 9 through a connector or the like. In addition, the flexible printed wiring board 13 is also connected to the electrical circuit board 9 through a connector or the like. Moreover, the electrical circuit board 9 is connected to the lens CPU 301.

Next, an operation of the image blur correction unit 305 of the present invention will hereinafter be described. First of all, the initial operation of the image blur correction unit 305 the outline of which was given previously will now be described in detail.

The initial operation of the image blur correction unit 305 means a processing for setting the lock ring (lock member) 10 in a predetermined initial state (reference position), i.e., a processing for necessarily driving the lock ring 10 upon turn-ON of the power source to set the lock ring 10 in the predetermined initial state (reference position) in order to cope with a case where the supply of the electric power from the power source is cut off in the middle of driving the lock ring 10 by stepping motor 11 and the position of the lock ring 10 is shifted (unexpectedly rotated) owing to a shock or the like so that the current lock state cannot be identified from the predetermined reference position.

For example, when the stepping motor (pulse drive motor) 11 is used as a drive source for the lock ring 10 as in this embodiment, the lock ring 10 is caused to reach the target position by controlling the number of drive pulses from the predetermined reference position up to the target position. When the lock ring 10 is unexpectedly rotated owing to a shock or the like, and thus the current position (how many pulses the lock ring 10 has to be shifted from the predetermined reference position up to the target position) is not found out from the predetermined reference position, the precise number of pulses up to the target position cannot be calculated. Thus, firstly, the operation for determining the predetermined reference position is required.

Note that in this embodiment, the predetermined initial state (predetermined reference position) means a position closer to the mechanical end 1x-1-a on the lock side than the state shown in FIG. 11 (the boundary position where the bend piece portion 10b barely avoids interrupting the sensor position 12B (the sensor portion is disposed on the line 12B) of the photo-interrupter 12 when viewed from the optical axis direction) by the predetermined number of pulses (predetermined time period).

The reason that the position obtained through the shift from the state of FIG. 11 by several pulses (predetermined time period) is set as the reference position is that if the state of FIG. 11 is set as the reference position, then there is a possibility that the bend piece portion 10b sometimes interrupts the sensor portion of the photo-interrupter 12 or otherwise does not interrupt the sensor portion of the photo-interrupter 12 owing to the mechanical backlash resulting from the dimensional errors of the components and parts so that the lock detection is not stabilized and hence the control for the lock ring 10 may not be successfully carried out since the output signal of the photo-interrupter 12 becomes unstable. For example, if a posture of the lens main body is changed, then the lock ring 10 is shifted owing to the backlash of the components and parts by an amount corresponding to the backlash, and hence the level of the output signal changes. In this case, though the lock ring 10 is not driven, the region concerned is detected as the lock region or the lock and unlock incomplete region by mistake. Then, the position obtained through the shift from the state of FIG. 11 by the predetermined number of pulses (by the amount free from the influence of the backlash) is set as the reference position (the position towards the mechanical end 1x-1-a on the lock side in the case of this embodiment), thereby preventing the generation of the above-mentioned nonconformity. The predetermined number of pulses is normally set to about several pulses.

Figure 17:
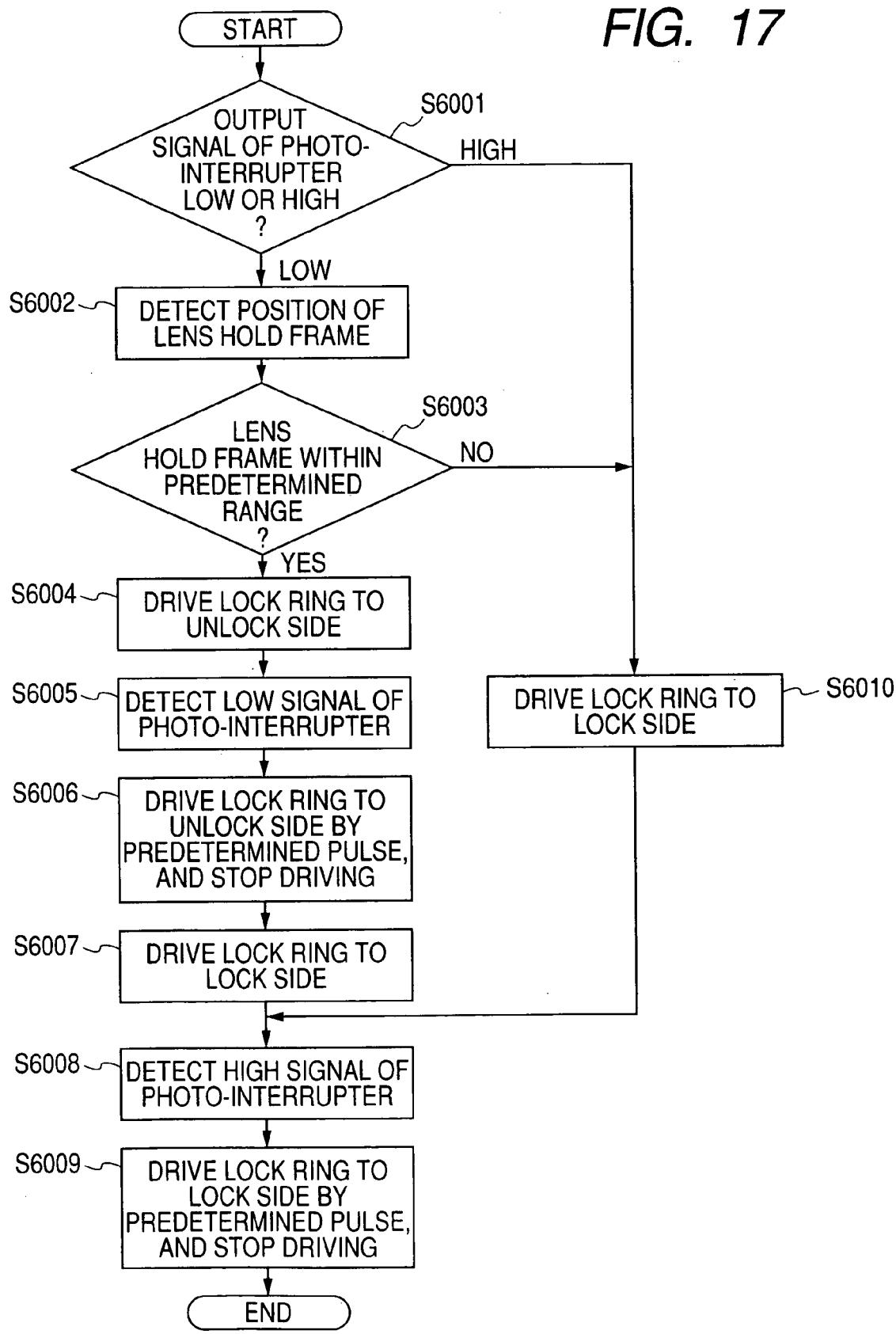
FIG. 17 is an operation flow chart in an initial operation of the image blur correction unit according to the embodiment of the present invention.

FIG. 17 is a flow chart of the initial operation of the image blur correction unit 305. Note that while as shown in FIG. 14, there are the mechanical lock region and the mechanical unlock region, and the electrical lock region and the electrical unlock region, the lock region and the unlock region in the following description mean the electrical lock region and the electrical unlock region.

First of all, when the power source switch 203 of the camera main body 200 is turned ON to start the supply of the electric power from the power source to the lens main body 300 (when an old battery is exchanged for new one, or when the lens main body 300 is installed to the camera main body 200, the communication is started between the camera main body 200 and the lens main body 300), it is judged whether the output signal of the photo-interrupter 12 is at a High level (the High level corresponds to the state where the bend piece portion 10*b* interrupts the sensor portion of the photo-interrupter 12 and hereinafter will be referred to as "H") or at a Low level (the Low level corresponds to the state where the bend piece portion 10*b* does not interrupt the sensor portion of the photo-interrupter 12 and hereinafter will be referred to as "L")(S6001).

Since in the case of L, it is not found out whether L is L in the lock region, or L in the unlock region, the judgment is carried out by executing the following processing. That is to say, first of all, the position of the lens hold frame 5 is detected based on the output signals from the light receiving elements 16*a* and 16*b* (S6002). Then, it is judged whether or not the lens hold frame 5 is located within a predetermined range (nearly in the optical axis central position) (S6003). When the judgment results show that the lens hold frame 5 is located within the predetermined range, it is judged that the lens hold frame 5 is located in the lock region. On the other hand, when the judgment results show that the lens hold frame 5 is located beyond the predetermined range, it is judged that the lens hold frame 5 is not located in the lock region. The above-mentioned processing shows whether L is L within the lock region, or L in the unlock region.

Next, when it is judged that L is L within the lock region, since it is not found out in what place the lens hold frame 5 is located, firstly, the lock ring 10 is driven to the unlock side once (S6004). Then, after it is detected that the output signal of the photo-interrupter 12 changes in level from L to H (S6005), the lock ring 10 is further driven to the unlock side by several pulses (predetermined time period), and the driving of the lock ring 10 is then stopped (S6006). Then, conversely, the lock ring 10 is driven to the lock side (S6007). Then, after it is verified that the output signal of the photo-interrupter 12 changes in level from H to L (S6008), the lock ring 10 is further driven to the lock side by several pulses (predetermined time period) and the driving is then stopped (S6009), thereby completing the initial operation of the image blur correction unit 305.

On the other hand, when it is judged in S6001 that the output signal of the photo-interrupter 12 is at H, or when it is judged in S6003 that the lens hold frame 5 is not located in the lock region, the lock ring 10 is driven to the lock side (S6010). Then, after it is detected that the output signal of the photo-interrupter 12 changes in level from H to L (S6008), the lock ring 10 is further driven to the lock side by several pulses (predetermined time period), and the driving is then stopped (S6009), thereby completing the initial operation of the image blur correction unit 305.

Next, a description will hereinafter be given with respect to the driving of the lock ring 10 after the initial operation is carried out. The lock ring 10 is driven from the reference position set in the initial operation to the unlock side in accordance with a lock release command issued from the lens CPU 301. Then, after it is detected that the output signal of the photo-interrupter 12 changes in level from H to L, the lock ring 10 is further driven to the unlock side by several pulses (predetermined time period), and the driving of the lock ring 10 is then stopped, thereby completing the lock release operation. Then, the operation proceeds to the image blur correction operation. After that, when the lock driving command is issued from the lens CPU 301, the lock ring 10 is driven to the lock side.

Then, after it is detected that the output signal of the photo-interrupter 12 changes in level from H to L, the lock ring 10 is further driven to the lock side by several pulses (predetermined time period), and the driving is then stopped (stopped at the reference position), thereby completing the lock operation.

Figure 18:
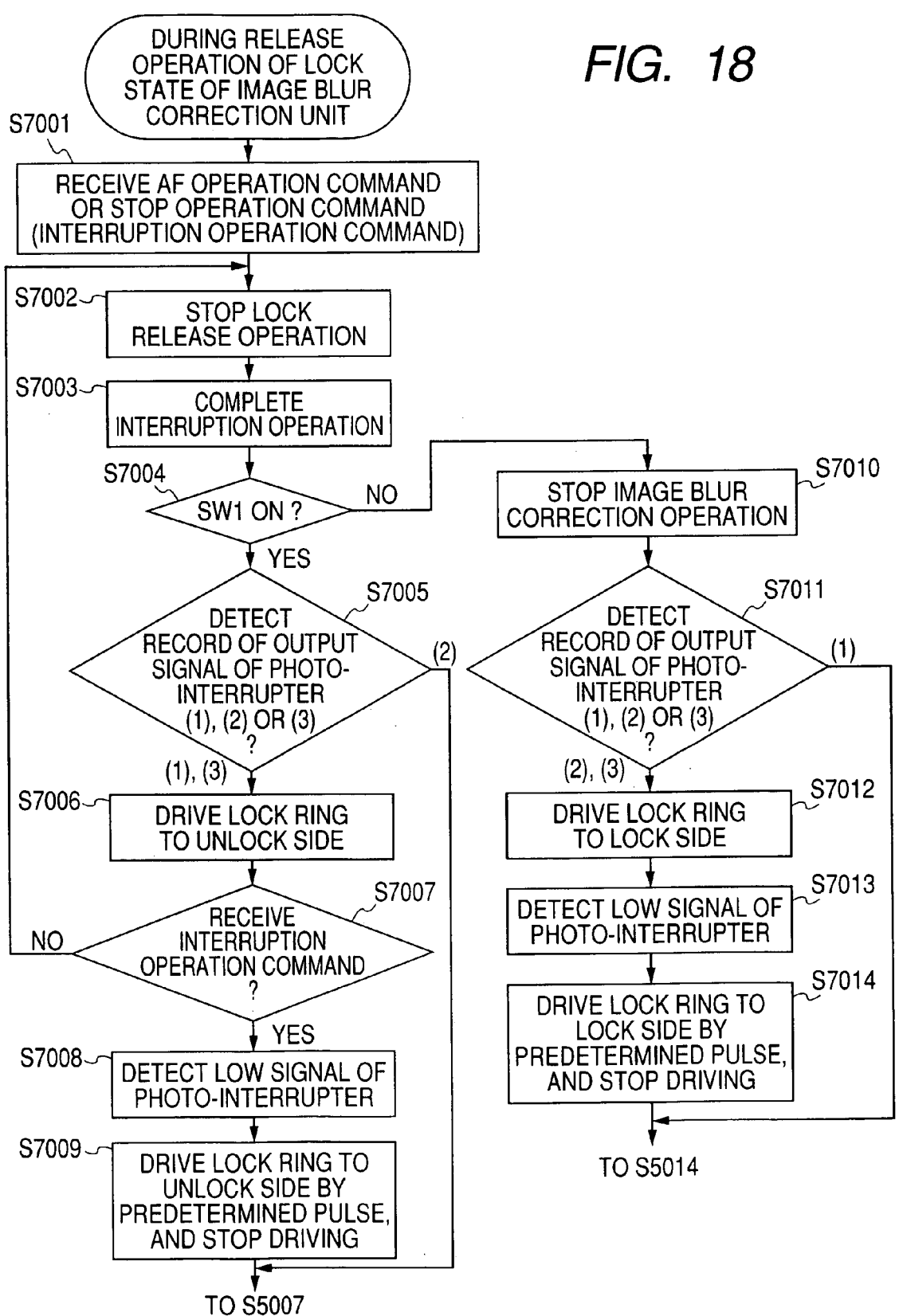
FIG. 18 is an operation flow chart in an interruption operation of the image blur correction unit according to the embodiment of the present invention.

Now, in the camera system 200 and the lens system 300, an interruption of the focal point detection operation, the focus operation, or the stop operation may occur in the middle of the operation for releasing the lock state of the image blur correction unit 305 in S5006 and S5017 shown in FIG. 16. When such an interruption occurs, the lock ring 10 is forcibly stopped with the lock ring 10 being located in the electrical lock and unlock incomplete region. An operation in this case will hereinafter be described with reference to a flow chart shown in FIG. 18.

First of all, when the focal point detection operation command, the focus operation command, or the stop operation command is issued in the form of an interruption operation from the camera CPU 201 again in the middle of the operation for releasing the lock state of the image blur correction unit 305 in S5006 of FIG. 16 (S7001), the lens CPU 301 which has received such a command from the camera CPU 201 sends a driving stop signal for the lock ring 10 to the stepping motor 11 to forcibly stop the drive of the lock ring 10 (S7002). In this operation, the lens CPU 301 stores history of the output signal of the photo-interrupter 12 (history from start of the unlock to occurrence of an interruption). The history of the output signal is related to whether the stopped position of the lock ring 10 is 1) "L did not pass through H," 2) "L passed through H," or 3) "H," and thus the lens CPU 301 stores this history information.

Next, when the focal point detection and focus operation or the stop operation as the interruption operation is completed (S7003), it is judged whether or not the signal SW1 is in an ON state (S7004). When the judgment results show that the signal SW1 is in the ON state (Y in FIG. 18), it is judged based on the above-mentioned history of the output signal of the photo-interrupter 12 in what place the lock ring 10 is located. In the case of "L passed through H" (2), it is judged that the lock ring 10 is already located in the unlock region. Hence, the operation proceeds to a processing of Step S5007.

On the other hand, in the case of "L did not pass through H" (1), or "H" (3), since it is judged that the lock ring 10 is not located in the unlock region, the lock ring 10 is driven to the unlock side (S7006). Next, while the lock ring 10 is driven to the unlock side, it is monitored whether or not an interruption of the focal point detection and focus operation, or the stop operation occurs again. When the monitoring results show that the interruption of the focal point detection and focus operation, or the stop operation occurs, the operation proceeds to a processing of Step S7002. On the other hand, when the monitoring results show that such an interruption does not occur, it is detected that the output signal of the photo-interruption 12 changes in level from H to L (S7008). After that, the lock ring 10 is further driven to the unlock side by several pulses (predetermined time period) to stop the driving of the lock ring 10 (S7009), thereby completing the unlock operation. Then, the operation proceeds to a processing in Step S5007. Here, the reason that the lock ring 10 is driven to the unlock side by the several pulses (predetermined time period) is the same as that in consideration when the reference position of the lock ring 10 is set. Thus, this driving operation is a processing for stabilizing the output signal of the photo-interrupter 12 in the stop position in the unlock region.

When the results of the judgment related to whether or not the signal SW1 is in the ON state (S7004) show that the signal SW1 is in the OFF state (N in FIG. 18), firstly, the image blur correction operation is stopped (S7010). Then, it is judged based on the above-mentioned history of the output signal of the photo-interrupter 12 in what place the lock ring 10 is located. In the case of "L did not pass through H" (1), it is judged that the lock ring 10 is already located in the lock region. Hence, the operation proceeds to the processing of Step S5014. On the other hand, in the case of "L passed through H" (2) or "H" (3), since it is judged that the lock ring 10 is not located in the lock region, the lock ring 10 is driven to the lock side (S7012). Then, after it is detected that the output signal of the photo-interrupter 12 changes in level from H to L (S7013), the lock ring 10 is further driven to the lock side by several pulses (predetermined time period), and the driving of the lock ring 10 is then stopped (S7014), thereby completing the lock operation. Then, the operation proceeds to the processing of S5014.

According to this embodiment of the present invention as described above, since the lock ring 10 can be prevented from colliding with the mechanical end of the base member 1, the impulsive sound during the collision is not generated. In addition, when the speed of the operation for driving the lock ring 10 is increased, it is possible to avoid the damage of the gear portion during the collision due to an increase in impact force. Moreover, since the position detector of the lock ring 10 is constituted by one detector, it is possible to provide a miniature image blur correction apparatus.

In this embodiment, the bend piece portion 10b is provided in the lock ring 10, and the photo-interrupter 12 or the like is provided in the base member 1. However, even when the photo-interrupter 12 or the like is provided in the lock ring 10 and the bend piece member 10b is provided in the base member 1, it is possible to obtain the construction showing the same functions and effects as those of the former.

In addition, while the stepping motor 11 (pulse drive motor) is used as the drive source for the lock ring 10, any other motor may be used. For example, there may also be used a D.C. motor provided with rotation angle detection means such as an encoder for outputting a pulse output signal in correspondence to an angle of rotation.

In addition, even when the encoder or the like is not provided, if the driving of the lock ring 10 is stopped after a lapse of a predetermined time period after a trigger signal (a signal when the output signal of the photo-interrupter 12 changes in level from L to H or from H to L in this embodiment of the present invention) of the output signal from the position detection circuit of the lock ring 10 is detected, the lock ring 10 can be surely stopped in the lock state or in the unlock state. Hence, it is possible to avoid such anxiety that the bend piece portion 10b of the lock ring 10 sometimes interrupts the sensor portion of the photo-interrupter 12 or the like or, otherwise does not interrupt the sensor portion of the photo-interrupter 12 owing to the mechanical backlash resulting from the dimensional errors of the components and parts so that the lock ring 10 cannot be successfully controlled since the output signal of the position detection circuit swings in level between L and H and hence the detection of the lock state or the unlock state is not stabilized.

As apparent from the foregoing as well, while in this embodiment, there has been described the example in which the present invention is applied to the camera, the present invention is not intended to be limited to the camera, and hence the present invention may also be applied to optical apparatuses other than the camera.

As set forth hereinabove, according to this embodiment, even when the power source switch 203 of the camera main body 200 is turned ON to start the supply of the electric power from the power source to the lens main body 300 (or the communication is started between the camera main body 200 and the lens main body 300 when an old battery is exchanged for new one, or when the lens main body 300 is installed to the camera main body 200), the lock ring 10 can be driven to the predetermined reference position (initial state) without collision with the mechanical end and thus no impulsive sound is generated. Hence, it is possible to provide the image blur correction device in which the durability of the movement transfer mechanism of the lock ring 10 is enhanced.

Moreover, according to this embodiment, even when an interruption processing such as the focus operation or the stop setting operation is executed during the driving of the lock ring 10, the lock ring 10 can be driven to the predetermined reference position (initial state) without collision with the mechanical end and thus no impulsive sound is generated. Hence, it is possible to provide the image blur correction optical device in which the durability of the movement transfer mechanism of the lock ring 10 is enhanced.

Furthermore, according to this embodiment, the impulsive sound can be avoided without using an elastic member an amount of elastic deformation of which is changed by the impact force. Hence, it is possible to provide the image blur correction optical device having the construction which can sufficiently cope with the high-speed driving of the lock ring 10.

According to a first construction of the position control device of the present invention, even when the second movable member is located in any position from the first region to the third region, the second movable member can be precisely moved to the specific position (second predetermined position) within the first region using the two simple detection means.

In addition, for example, even when the block portions for limiting the movable range of the second movable member are provided in the first and second regions, respectively, since the second movable member can be moved to the first specific position without being caused to abut against the block portions, it is possible to block the generation of an abnormal sound during the abutment.

According to a second construction of the position control device of the present invention, even when the second movable member is located in any position from the first region to the third region when the control is interrupted after start of the control for the actuator, the contents of the control for the actuator after the control is restarted can be determined based on the output history of the first and second signals.

As many apparently widely different embodiments of the present invention can be made without departing from the spirit and scope thereof, it is to be understood that the invention is not limited to the specific embodiments thereof except as defined in the claims.

This application claims priority from Japanese Patent Application No. 2004-024924 filed on Jan. 30, 2004, which is hereby incorporated by reference herein.

What is claimed is:

1. A position control device, comprising:
   a first movable member;
   a second movable member for moving among a first region in which the first movable member is locked in a first predetermined position, a second region in which the lock state of the first movable member is released, and a third region which is as a transfer region between the first region and the second region;
   a first detector for outputting a position signal corresponding to whether or not the first movable member is located in the first predetermined position;
   a second detector for outputting a first signal in a state where the second movable member is located in one of the first region and the second region, and for outputting a second signal in a state where the second movable member is located in the third region; and
   a controller for controlling an actuator for driving the second movable member,
   wherein the controller discriminates the region in which the second movable member is located based on the position signal, the first signal and the second signal, when the discrimination result shows that the second movable member is located in the first region, controls the actuator in a first mode to move the second movable member to a second predetermined position set in the first region, and when the discrimination result shows that the second movable member is located in one of the second region and the third region, controls the actuator in a second mode to move the second movable member to the second predetermined position.

2. A position control device according to claim 1, wherein when controlling the actuator in the first mode, the controller drives the second movable member to a side of the third region until an amount of driving of the second movable member from a time point when the first signal is changed over to the second signal reaches a first predetermined amount, and drives the second movable member to a side of the first region until an amount of driving of the second movable member from a time point when the second signal is changed over to the first signal reaches a second predetermined amount corresponding to an amount of driving of the second movable member up to the second predetermined position, and
   when controlling the actuator in the second mode, the controller drives the second movable member to the side of the first region until an amount of driving of the second movable member from a time point when the second signal is changed over to the first signal reaches the second predetermined amount.

3. A position control device according to claim 1, wherein the second predetermined position comprises an initialization position of the second movable member.

4. A position control device, comprising:
   a first movable member;
   a second movable member for moving among a first region in which the first movable member is locked in a first predetermined position, a second region in which the lock state of the first movable member is released, and a third region which is as a transfer region between the first region and the second region;
   a first detector for outputting a position signal corresponding to whether or not the first movable member is located in the first predetermined position;
   a second detector for outputting a first signal in a state where the second movable member is located in one of the first region and the second region, and for outputting a second signal in a state where the second movable member is located in the third region; and
   a controller for controlling an actuator for driving the second movable member,
   wherein the controller moves the second movable member to a second predetermined position set in the first region based on the position signal, the first signal and the second signal.

5. A position control device, comprising:
   a first movable member;
   a second movable member for moving among a first region in which the first movable member is locked in a first predetermined position, a second region in which the lock state of the first movable member is released, and a third region which is as a transfer region between the first region and the second region;
   a detector for outputting a first signal in a state where the second movable member is located in one of the first region and the second region, and for outputting a second signal in a state where the second movable member is located in the third region; and
   a controller for controlling an actuator for driving the second movable member,
   wherein when the control for the actuator is interrupted, the controller determines a control content after restart of the control for the actuator based on output history of the first signal and the second signal from the detector until the interruption.

6. A position control device according to claim 5, wherein the controller discriminates whether the output history comprises first history in which the first signal is output without through the output the second signal, second history in which the first signal is output through the output of the second signal, or third history in which the second signal is output through the output of the first signal.

7. A position control device according to claim 6, wherein the controller determines a driving direction of the second movable member after restart of the control for the actuator based on a signal from an outside,
   in a case where the determination results show a side of the first region, when the output history comprises one of the first history and the third history, the controller drives the second movable member to the side of the first region, and when the output history comprises the first history, the controller stops the actuator, and
   in a case where the determination results show a side of the second region, when the output history comprises the first history and the third history, the controller drives the second movable member to the side of the second region, and when the output history comprises the second history, the controller stops the actuator.

8. An image blur correction device, comprising:
   a lens hold member;
   a lock movable member for moving among a first region in which the lens hold member is locked in a first predetermined position, a second region in which the lock state of the lens hold member is released, and a third region which is as a transfer region between the first region and the second region;
   a first detector for outputting a position signal corresponding to whether or not the lens hold member is located in the first predetermined position;
   a second detector for outputting a first signal in a state where the lock member is located in one of the first region and the second region, and for outputting a lock in a state where the lock member is located in the third region; and a controller for controlling an actuator for driving the lock member, wherein the controller discriminates the region in which the lock member is located based on the position signal, the first signal and the second signal, when the discrimination result shows that the lock member is located in the first region, controls the actuator in a first mode to move the lock member to a second predetermined position set in the first region, and when the discrimination result shows that the lock member is located in one of the second region and the third region, controls the actuator in a second mode to move the lock member to the second predetermined position.

9. An image blur correction device, comprising:

a lens hold member;

a lock for moving among a first region in which the lens hold member is locked in a first predetermined position, a second region in which the lock state of the lens hold member is released, and a third region which is as a transfer region between the first region and the second region;

a first detector for outputting a position signal corresponding to whether or not the lens hold member is located in the first predetermined position;

a second detector for outputting a first signal in a state where the lock member is located in one of the first region and the second region, and for outputting a second signal in a state where the lock member is located in the third region; and a controller for controlling an actuator for driving the lock member, wherein the controller, moves the lock member to a second predetermined position set in the first region based on the position signal, and the first signal and the second signal.

10. An image blur correction device, comprising:

a lens hold member;

a lock member for moving among a first region in which the lens hold member is locked in a first predetermined position, a second region in which the lock state of the lens hold member is released, and a third region which is as a transfer region between the first region and the second region;

a detector for outputting a first signal in a state where the lock member is located in one of the first region and the second region, and for outputting a second signal in a state where the lock member is located in the third region; and a controller for controlling an actuator for driving the lock member, wherein when the control for the actuator is interrupted, the controller determines a control content after restart of the control for the actuator based on output history of the first signal and the second signal from the detector until the interruption.

11. An optical apparatus comprising the position control device according to claim 1.

12. An optical apparatus comprising the position control device according to claim 4.

13. An optical apparatus comprising the position control device according to claim 5.

14. An optical apparatus comprising the image blur correction device according to claim 8.

15. An optical apparatus comprising the image blur correction device according to claim 9.

16. An optical apparatus comprising the image blur correction device according to claim 10.

* * * * *

UNITED STATES PATENT AND TRADEMARK OFFICE
CERTIFICATE OF CORRECTION

PATENT NO. : 7,149,419 B2 Page 1 of 1
APPLICATION NO. : 11/032647
DATED : December 12, 2006
INVENTOR(S) : Hiroshi Akada It is certified that error appears in the above-identified patent and that said Letters Patent is hereby corrected as shown below:

Column 11, line 15, delete " i$f$ " and insert -- $1f$ --

Column 12, line 43, change " portion in the " to -- portion $1n$ in the --

Signed and Sealed this

Twenty-eighth Day of August, 2007

JON W. DUDAS
*Director of the United States Patent and Trademark Office*